US012795164B2

(12) United States Patent
Xu

(10) Patent No.: US 12,795,164 B2
(45) Date of Patent: Nov. 10, 2026

(54) VIDEO ENCODING METHOD, VIDEO DECODING METHOD, DEVICE, SYSTEM, AND STORAGE MEDIUM

(71) Applicant: GUANGDONG OPPO MOBILE TELECOMMUNICATIONS CORP., LTD., Dongguan (CN)

(72) Inventor: Luhang Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 278 days.

(21) Appl. No.: 18/614,082

(22) Filed: Mar. 22, 2024

(65) Prior Publication Data

US 2024/0236371 A1 Jul. 11, 2024

Related U.S. Application Data

(63) Continuation of application No. PCT/CN2021/120773, filed on Sep. 26, 2021.

(51) Int. Cl.

*H04N 19/60* (2014.01)
*H04N 19/103* (2014.01)
*H04N 19/18* (2014.01)

(52) U.S. Cl.

CPC ........... *H04N 19/60* (2014.11); *H04N 19/103* (2014.11); *H04N 19/18* (2014.11)

(58) Field of Classification Search

CPC ...... H04N 19/60; H04N 19/103; H04N 19/18; H04N 19/147; H04N 19/159; H04N 19/12; H04N 19/176; H04N 19/61; H04N 19/70

See application file for complete search history.

(56) References Cited

U.S. PATENT DOCUMENTS 11,425,421 B1 * 8/2022 Koo ..................... H04N 19/159
12,200,250 B2 * 1/2025 Zhao ...................... H04N 19/18

(Continued)

FOREIGN PATENT DOCUMENTS

CN 101719261 A 6/2010
CN 110519601 A 11/2019

(Continued)

OTHER PUBLICATIONS

International Search Report in the international application No. PCT/CN2021/120773, mailed on Apr. 14, 2022. 7 pages with English translation.

(Continued)

*Primary Examiner* — Stephen R Koziol
*Assistant Examiner* — Michael Kim Maiden
(74) *Attorney, Agent, or Firm* — BAYES PLLC

(57) ABSTRACT

A video encoding method is provided, which includes that: a secondary transform coefficient of a current block is obtained by decoding a code stream, the secondary transform coefficient is a transform coefficient formed by an encoding terminal performing secondary transform on a residual block of the current block; if it is determined that the use of a weighted prediction mode is allowed for an intra-frame prediction mode of the current block, a target transform kernel corresponding to the current block is selected from transform kernels of preset M types of secondary transform, M is a positive integer greater than 1; inverse secondary transform is performed on the secondary transform coefficient by using the target transform kernel to obtain a primary transform coefficient of the current block; and inverse primary transform is performed on the primary transform coefficient to obtain the residual block of the current block.

20 Claims, 21 Drawing Sheets

(56) References Cited

U.S. PATENT DOCUMENTS

| | | | | |
|---|---|---|---|---|
| 2017/0374369 | A1 | 12/2017 | Chuang et al. | |
| 2020/0322611 | A1* | 10/2020 | Salehifar ................ | H04N 19/12 |
| 2021/0352326 | A1 | 11/2021 | Lim | |

FOREIGN PATENT DOCUMENTS

| | | | | |
|---|---|---|---|---|
| CN | 111355955 | A | 6/2020 | |
| CN | 112422991 | A | 2/2021 | |
| CN | 112740684 | A * | 4/2021 | ............. H04N 19/18 |
| EP | 4087252 | A1 | 11/2022 | |
| EP | 4087253 | A1 | 11/2022 | |
| WO | 2021134327 | A1 | 7/2021 | |
| WO | 2021134635 | A1 | 7/2021 | |

OTHER PUBLICATIONS

Written Opinion of the International Search Authority in the international application No. PCT/CN2021/120773, mailed on Apr. 14, 2022. 10 pages with English translation.

Supplementary European Search Report in the European application No. 21957986.9, mailed on May 6, 2025, 13 pages.

* cited by examiner

VIDEO ENCODING METHOD, VIDEO DECODING METHOD, DEVICE, SYSTEM, AND STORAGE MEDIUM

CROSS-REFERENCE TO RELATED APPLICATION

This is a continuation application of International Patent Application No. PCT/CN2021/120773, filed on Sep. 26, 2021, the content of which is hereby incorporated by reference in its entirety.

BACKGROUND

Digital video technology can be integrated into a variety of video devices, such as digital television, smart phones, computers, e-readers or video players. With the development of video technology, video data includes a large amount of data. In order to facilitate the transmission of video data, video devices execute video compression technology to make video data more effectively transmitted or stored.

Video is compressed by encoding, and the encoding process includes such as prediction, transform and quantization. For example, a prediction block of a current block is determined by intra prediction and/or inter prediction, a residual block is obtained by subtracting the prediction block from the current block, the residual block is transformed to obtain a transform coefficient, the transform coefficient is quantized to obtain a quantization coefficient, and the quantization coefficient is encoded to form a bitstream.

In some cases, the intra prediction mode of the current block may be a weighted prediction mode and the transform mode of the current block may be a secondary transform mode. In this case, at present, in the secondary transform, the transform core corresponding to a certain intra prediction mode is selected fixedly, which makes the selection of the transform core of the secondary transform inflexible and the transform effect poor, and then leads to the overall performance of encoding and decoding is not ideal.

SUMMARY

The embodiments of the present disclosure provide a method for encoding video, a method for decoding video, devices, a system and a storage medium. A target transform core corresponding to a current block is selected from preset M types of transform cores of the secondary transform, instead of fixedly selecting a transform core corresponding to a certain mode, so that the selection flexibility of the transform core is improved, the transform effect is improved, and the overall performance of encoding and decoding is improved.

The present disclosure relates to the field of video coding and decoding technologies, in particular to a method for encoding video, a method for decoding video, devices, a system and a storage medium.

In the first aspect, the present disclosure provides a method for decoding video. The method includes the following operations.

A bitstream is decoded to obtain the second transform coefficient of a current block. The second transform coefficient is a transform coefficient formed through performing a secondary transform on a residual block of the current block by an encoding end.

In case of determining that an intra prediction mode of the current block allows using a weighted prediction mode, a target transform core corresponding to the current block is selected from preset M types of transform cores of the secondary transform. M is a positive integer greater than 1.

An inverse secondary transform is performed on the second transform coefficient by using the target transform core to obtain a primary transform coefficient of the current block.

An inverse primary transform is performed on the primary transform coefficient to obtain the residual block of the current block.

In the second aspect, an embodiment of the present disclosure provides a method for encoding video. The method includes the following operations.

In case of determining that an intra prediction mode of a current block allows using a weighted prediction mode, a target transform core corresponding to the current block is selected from preset M types of transform cores of a secondary transform. M is a positive integer greater than 1.

The current block is encoded to obtain a primary transform coefficient of the current block.

The secondary transform is performed on the primary transform coefficient by using the target transform core to obtain the second transform coefficient of the current block.

A bitstream is obtained based on the second transform coefficient of the current block.

In the third aspect, the present disclosure provides a video decoder for performing the method in the first aspect or various implementations thereof. In particular, the encoder includes function units for performing the method in the above first aspect or various implementations thereof.

DETAILED DESCRIPTION

The present disclosure may be applied to the fields of encoding and decoding the picture, encoding and decoding the video, encoding and decoding the video by hardware, encoding and decoding the video by special circuits, real-time encoding and decoding, and the like. For example, the solutions of the present disclosure may be in combination with audio video coding standards (AVS), such as H.264/audio video coding (AVC) standard, H.265/high efficiency video coding (HEVC) standard, and H.266/versatile video coding (VVC) standard. Alternatively, the solutions of the present disclosure may be in combination with other proprietary or industry standards, including ITU-TH.261, ISO/IECMPEG-1Visual, ITU-TH.262 or ISO/IECMPEG-2Visual, ITU-TH.263, ISO/IECMPEG-4Visual, ITU-TH.264 (also referred to as ISO/IECMPEG-4AVC), Scalable Video Coding (SVC) and Multi-view video codec (MVC) extensions. It should be understood that the solutions of the present disclosure are not limited to any particular codec standard or technologies.

For ease of understanding, a video codec system according to an embodiment of the present disclosure is first described with reference to FIG. 1.

Figure 1:
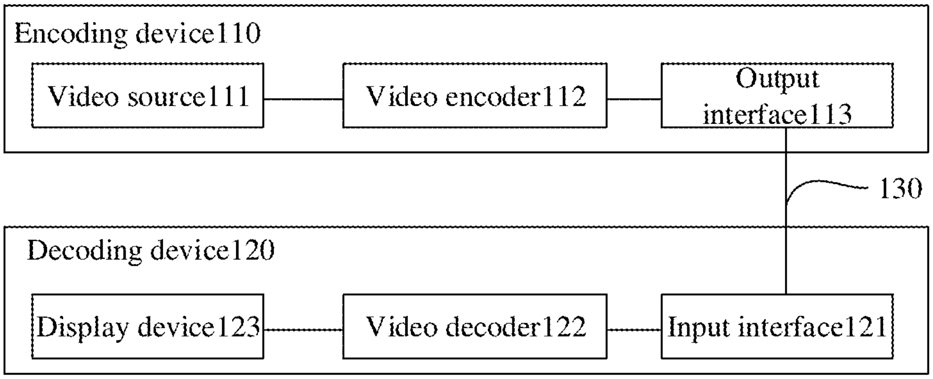
FIG. 1 is a schematic block diagram of a video codec system according to an embodiment of the present disclosure.

FIG. 1 is a schematic block diagram of a video codec system according to an embodiment of the present disclosure. It should be noted that FIG. 1 is only an example and the video codec system of the embodiment of the present disclosure includes but is not limited to the video codec system illustrated in FIG. 1. As illustrated in FIG. 1, the video codec system 100 includes an encoding device 110 and a decoding device 120. The encoding device is used for encoding (which may be understood as compressing) the video data to generate a bitstream and transmitting the bitstream to the decoding device. The decoding device decodes the bitstream generated by encoding through the encoding device to obtain decoded video data.

The encoding device 110 in the embodiment of the present disclosure may be understood as a device having a video encoding function, and the decoding device 120 may be understood as a device having a video decoding function. That is, the encoding device 110 and the decoding device 120 in the embodiment of the present disclosure include a wider range of devices, which include, for example, a smart phone, a desktop computer, a mobile computing device, a notebook (for example, laptop) computer, a tablet computer, a set-top box, a television, a camera, a display device, a digital media player, a video game console, an in-vehicle computer, and the like.

In some embodiments, the encoding device 110 may transmit the encoded video data (for example, a bitstream) to the decoding device 120 via a channel 130. The channel 130 may include one or more media and/or devices capable of transmitting encoded video data from encoding device 110 to decoding device 120.

In one example, the channel 130 includes one or more communication media that enables the encoding device 110 to transmit encoded video data directly to decoding device 120 in real time. In this example, the encoding device 110 may modulate the encoded video data according to the communication standard and transmit the modulated video data to the decoding device 120. The communication media includes a wireless communication media such as a radio frequency spectrum. Optionally, the communication media may also include a wired communication media such as one or more physical transmission lines.

In another example, the channel 130 includes a storage medium that may store video data encoded by the encoding device 110. The storage medium includes a variety of local access data storage medium, such as optical discs, DVDs, flash memories, etc. In this example, the decoding device 120 may obtain encoded video data from the storage medium.

In another example, the channel 130 may include a storage server that may store video data encoded by encoding device 110. In this example, the decoding device 120 may download the stored encoded video data from the storage server. Optionally, the storage server may store the encoded video data and may transmit the encoded video data to the decoding device 120 such as a web server (for example, for a web site), a File Transfer Protocol (FTP) server or the like.

In some embodiments, the encoding device 110 includes a video encoder 112 and an output interface 113. The output interface 113 may include a modulator/demodulator (modem) and/or a transmitter.

In some embodiments, the encoding device 110 may include a video source 111 in addition to the video encoder 112 and the input interface 113.

The video source 111 may include at least one of a video capture device (for example, a video camera), a video archive, a video input interface or a computer graphics system. The video input interface is used for receiving video data from a video content provider, and the computer graphics system is used for generating video data.

The video encoder 112 encodes video data from the video source 111 to generate a bitstream. The video data may include one or more pictures or sequences of pictures. The bitstream contains the encoded information of the picture or sequence of pictures in the form of a bit stream. The encoded information may include encoded picture data and associated data. The associated data may include a sequence parameter set (SPS), a picture parameter set (PPS), and other syntax structures. The SPS may contain parameters applied to one or more sequences. The PPS may contain parameters applied to one or more pictures. The syntax structure is a set of zero or more syntax elements arranged in a specified order in a bitstream.

The video encoder 112 transmits the encoded video data directly to the decoding device 120 via the output interface 113. The encoded video data may also be stored on a storage medium or a storage server for subsequent reading by the decoding device 120.

In some embodiments, the decoding device 120 includes an input interface 121 and a video decoder 122.

In some embodiments, the decoding device 120 may include a display device 123 in addition to an input interface 121 and a video decoder 122.

The input interface 121 includes a receiver and/or a modem. The input interface 121 may receive the encoded video data through the channel 130.

The video decoder 122 is used for decoding the encoded video data to obtain the decoded video data and transmitting the decoded video data to the display device 123.

The display device 123 displays the decoded video data. The display device 123 may be integrated with or external to the decoding device 120. The display device 123 may include a variety of display devices such as a liquid crystal display (LCD), a plasma display an organic light emitting diode (OLED) display or other types of display devices.

In addition, FIG. 1 is only an example, and the technical solutions of the embodiments of the present disclosure are not limited to FIG. 1. For example, the technology of the present disclosure may also be applied to unilateral video encoding or unilateral video decoding.

The video encoding framework related to embodiments of the present disclosure is described below.

Figure 2:
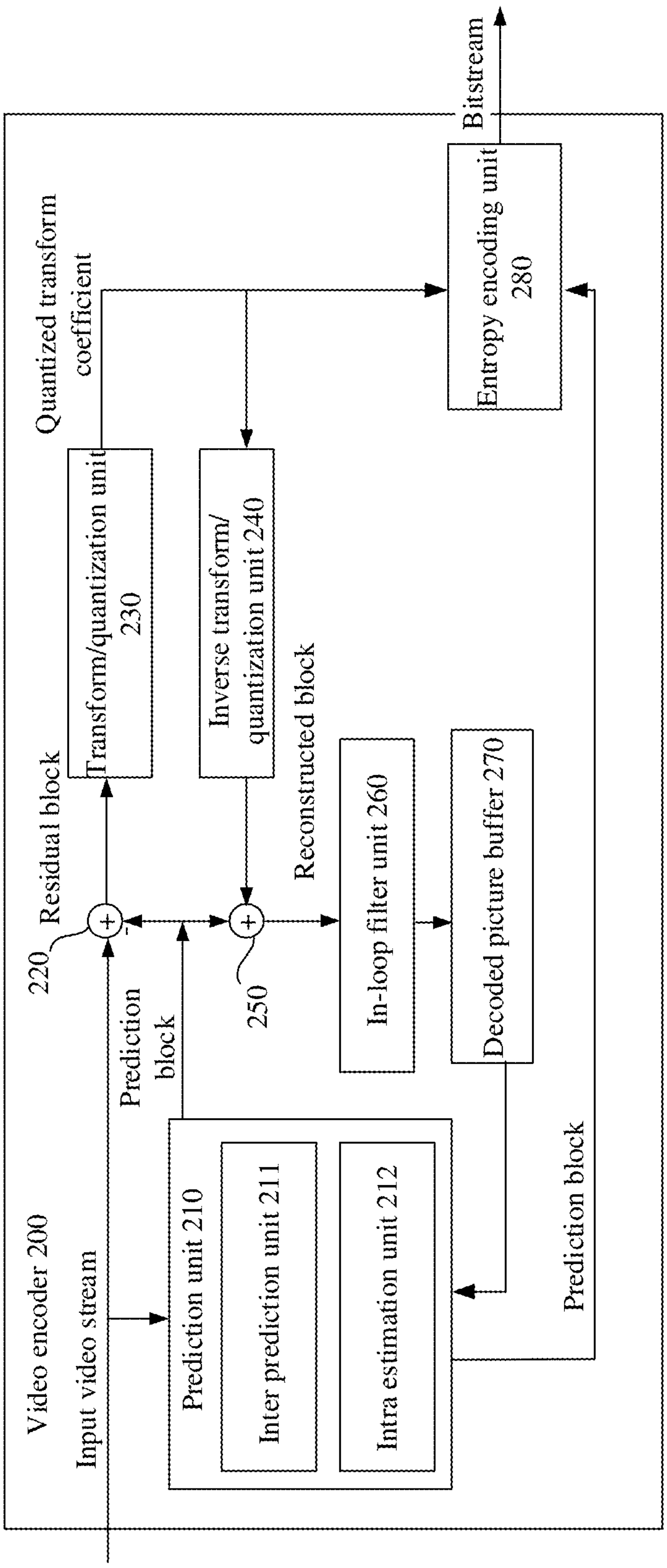
FIG. 2 is a schematic block diagram of a video encoder according to an embodiment of the present disclosure.

FIG. 2 is a schematic block diagram of a video encoder according to an embodiment of the present disclosure. It should be understood that the video encoder 200 may be used for lossy compression of a picture or lossless compression of a picture. The lossless compression may be visually lossless compression or mathematically lossless compression.

The video encoder 200 may be applied to picture data in format of luma and chroma (YCbCr, YUV). For example, the ratio of YUV may be 4:2:0, 4:2:2, or 4:4:4. Y represents Luma, Cb (U) represents blue chroma, Cr (V) represents red chroma, and U and V represent Chroma to describe colour and saturation. For example, in colour format, 4:2:0 represents that there are four luma components and two chroma components (YYYYCbCr) in every four pixels; 4:2:2 represents that there are four luma components and four chroma components (YYYYCbCrCbCr) in every four pixels, and 4:4:4 represents full pixel display (YYYYCbCrCbCrCbCrCbCr).

For example, the video encoder 200 reads video data and partitions a frame of picture into several coding tree units (CTUs) for each frame of picture in the video data. In some examples, the CTB may be referred to as a “tree block”, a “Largest Coding unit” (LCU) or a “coding tree block” (CTB). Each CTU may be associated with block of pixels with same size within the picture. Each pixel may correspond to one luminance or luma sample and two chrominance or chroma samples. Therefore, each CTU may be associated with one luma sampling block and two chroma sampling blocks. The size of a CTU is, for example, 128×128, 64×64, 32×32, etc. A CTU may be further partitioned into several Coding Units (CUs) for encoding, and the CU may be a rectangular block or a square block. The CU may be further partitioned into prediction Units (PUs) and transform units (TUs), which enables the processes of encoding, prediction and transform separation to be more flexible. In one example, a CTU is partitioned into CUs in a manner of quadtree, and a CU is partitioned into TUs, PUs in a manner of quadtree.

The video encoder and video decoder may support various sizes of PU. It is assumed that the size of a particular CU is 2N×2N. The video encoder and video decoder may support a size of 2N×2N or N×N of a PU for intra prediction and a symmetric PU of 2N×2N, 2N×N, N×2N, N×N or similar size for inter prediction. The video encoder and video decoder may also support an asymmetric PU of 2N×nU, 2N×nD, nL×2N or nR×2N for inter prediction.

In some embodiments, as illustrated in FIG. 2, the video encoder 200 may include a prediction unit 210, a residual unit 220, a transform/quantization unit 230, an inverse transform/quantization unit 240, a reconstruction unit 250, an in-loop filter unit 260, a decoded picture buffer 270, and an entropy encoding unit 280. It should be noted that the video encoder 200 may include more, fewer or different functional components.

Optionally, in the present disclosure, the current block may be referred to as a current coding unit (CU) or a current prediction unit (PU) or the like. The prediction block may also be referred to as a prediction picture block or a picture prediction block, and the reconstructed picture block may also be referred to as a reconstructed block or a picture reconstruction picture block.

In some embodiments, the prediction unit 210 includes an inter prediction unit 211 and an intra estimation unit 212. Because there is a strong correlation between adjacent pixels in a video frame, intra prediction method is used to eliminate spatial redundancy between adjacent pixels in video encoding and decoding technology. Because there is a strong similarity between adjacent frames in video, inter prediction method is used to eliminate temporal redundancy between adjacent frames in the video encoding and decoding technology, so as to improve coding efficiency.

The inter prediction unit 211 may be used for inter prediction. The inter prediction may refer to picture information of different frames, finds a reference block from reference frames by using motion information, and generates a prediction block based on the reference block to eliminate temporal redundancy. The frame used for inter prediction may be P frame and/or B frame. The P frame refers to a forward prediction frame and the B frame refers to a bidirectional prediction frame. The motion information includes a reference frame list where the reference frame is located, a reference frame index, and a motion vector. The motion vector may be integer pixel or sub-pixel. If the motion vector is sub-pixel, it is necessary to use interpolation filtering in the reference frame to make the required sub-pixel block. The integer pixel or sub-pixel block in the reference frame found based on the motion vector is called a reference block. Some technologies will directly use reference block as prediction block, while others will reprocess on the basis of a reference block to generate a prediction block. Reprocessing on the basis of the reference block to generate prediction block may also be understood as using the reference block as the prediction block and then processing on the basis of the prediction block to generate a new prediction block.

The intra estimation unit 212 refers only to the information of the same frame of picture and predicts the pixel information in the current picture block, to eliminate spatial redundancy. The frame used for intra prediction may be an I frame. For example, for a current block of 4×4, the pixels in the left row and the top column of the current block are the reference pixels of the current block, and intra prediction uses these reference pixels to predict the current block. All these reference pixels may have been available, that is, all of them have been encoded or decoded. The part of reference pixels may be unavailable. For example, if the current block is the leftmost part of the whole frame, the reference pixels to the left of the current block are unavailable. Optionally, when the current block is encoded or decoded, the bottom-left part of the current block has not been encoded or decoded, so the bottom-left reference pixels are not available. In cases where reference pixels are not available, they may be filled using the available reference pixels or some value or some method, or they may not be filled.

There are many prediction modes for intra prediction. Take the international digital video coding standard H series as an example, H.264/AVC standard has 8 angular prediction modes and one non-angular prediction mode, and H.265/HEVC standard extends to 33 angular prediction modes and 2 non-angular prediction modes. The intra prediction modes used by HEVC include a Planar mode, a DC mode and 33 angular modes, with a total of 35 prediction modes. The intra modes used by VVC include a Planar mode, a DC mode and 65 angular modes, with a total of 67 prediction modes. For the luma component, there is a Matrix based intra prediction (MIP) prediction mode, and for chroma component, there is a Cross Component Linear Model (CCLM) prediction mode.

It should be noted that with the increase of angular modes, intra prediction will be more accurate and more in line with the requirement of the development of high-definition and ultra-high-definition digital video.

The residual unit 220 may generate a residual block of the CU based on a pixel block of the CU and a prediction block of the PU of the CU. For example, the residual unit 220 may generate a residual block of the CU, such that each sample in the residual block has a value equal to the difference between a sample in a pixel block of the CU and a corresponding sample in a prediction block of the PU of the CU.

The transform/quantization unit 230 may quantify the transform coefficients. The transform/quantization unit 230 may quantify transform coefficients associated with a TU of a CU based on a quantization parameter (QP) value associated with the CU. The video encoder 200 may adjust the degree of quantization applied to the transform coefficients associated with the CU by adjusting the QP value associated with the CU.

The inverse transform/quantization unit 240 may apply inverse quantization and inverse transform to the quantized transform coefficients respectively to reconstruct the residual block from the quantized transform coefficients.

The reconstruction unit 250 may add the sample of the reconstructed residual block to a corresponding sample of one or more prediction blocks generated by the prediction unit 210 to generate a reconstructed picture block associated with the TU. The sample block of each TU of the CU is reconstructed in this manner, and the video encoder 200 may reconstruct the pixel blocks of the CU.

The in-loop filter unit 260 may perform a deblocking filtering operation to reduce blocking effects of pixel blocks associated with the CUs.

In some embodiments, the in-loop filter unit 260 includes a deblocking filter unit and a Sample Adaptive Offset/Adaptive Loop Filter (SAO/ALF) unit. The deblocking filter unit is used for removing blocking effects, and the SAO/ALF unit is used for removing ringing effects.

The decoded picture buffer 270 may store the reconstructed pixel blocks. The inter prediction unit 211 may use the reference pictures containing the reconstructed pixel blocks to perform inter prediction on PUs of other pictures. In addition, the intra estimation unit 212 may use the reconstructed pixel blocks in the decoded picture buffer 270 to perform intra prediction on other PUs in the same image as the CU.

The entropy encoding unit 280 may receive the quantized transform coefficients from the transform/quantization unit 230. The entropy encoding unit 280 may perform one or more entropy encoding operations on the quantized transform coefficients to generate entropy encoded data.

Figure 3:
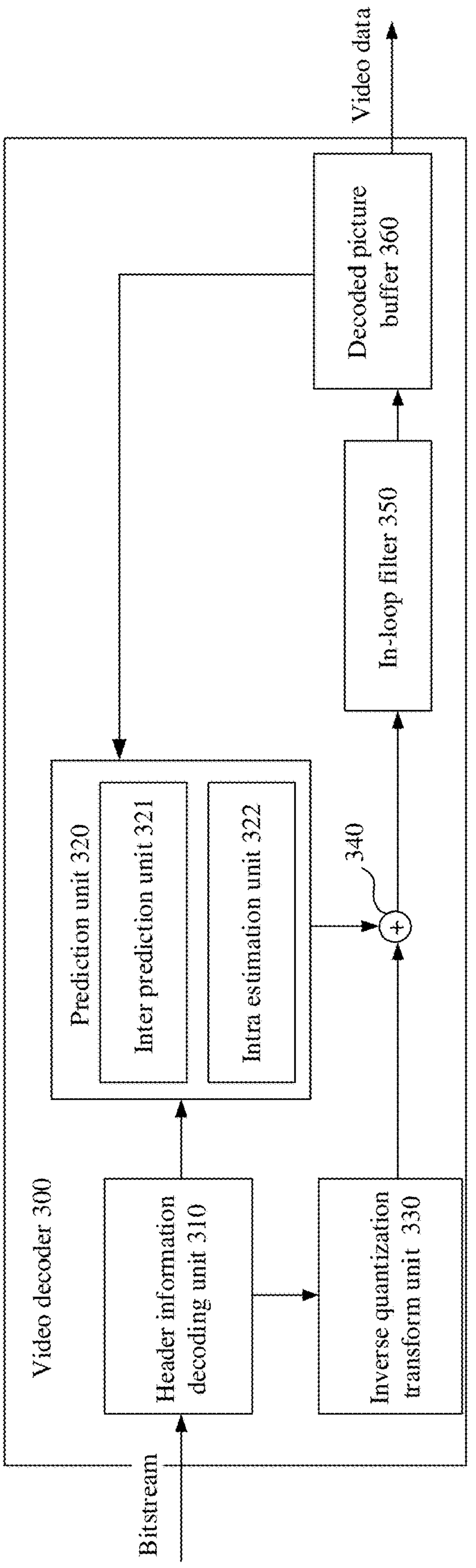
FIG. 3 is a schematic block diagram of a video decoder according to an embodiment of the present disclosure.

FIG. 3 is a schematic block diagram of a video decoder according to an embodiment of the present disclosure.

As illustrated in FIG. 3, the video decoder 300 includes an entropy decoding unit 310, a prediction unit 320, an inverse quantization transform unit 330, a reconstruction unit 340, an in-loop filter unit 350 and a decoded picture buffer 360. It should be noted that the video decoder 300 may include more, fewer or different functional components.

The video decoder 300 may receive a bitstream. The entropy decoding unit 310 may parse the bitstream to extract syntax elements from the bitstream. As part of the parsing bitstream, the entropy decoding unit 310 may parse the entropy-encoded syntax elements in the bitstream. The prediction unit 320, the inverse quantization transform unit 330, the reconstruction unit 340 and the in-loop filter unit 350 may decode the video data based on the syntax elements extracted from the bitstream, that is, generate decoded video data.

In some embodiments, the prediction unit 320 includes an intra estimation unit 321 and an inter prediction unit 322.

The intra estimation unit 321 (also referred to as the intra prediction unit) may perform intra prediction to generate a prediction block of the PU. The intra estimation unit 321 may use the intra prediction mode to generate a prediction block of the PU based on pixel blocks of spatially adjacent PUs. The intra estimation unit 321 may also determine the intra prediction mode of the PU based on one or more syntax elements parsed from the bitstream.

The inter prediction unit 322 may construct the first reference picture list (List 0) and the second reference picture list (List 1) based on the syntax elements parsed from the bitstream. In addition, if the inter prediction encoding is used for the PU, the entropy decoding unit 310 may parse motion information of the PU. The inter prediction unit 322 may determine one or more reference blocks of the PU based on motion information of the PU. The inter prediction unit 322 may generate a prediction block of the PU based on one or more reference blocks of the PU.

The inverse quantization transform unit 330 (also referred to as an inverse quantization/transform unit) reversibly quantizes (i.e. de-quantizes) transform coefficients associated with the TU. The inverse quantization transform unit 330 may determine the degree of quantization by using the QP value associated with the CU of the TU.

After reversibly quantizing the transform coefficients, the inverse quantization transform unit 330 may apply one or more inverse transforms to the inverse quantized transform coefficients to generate a residual block associated with the TU.

The reconstruction unit 340 uses the residual block associated with the TU of the CU and the prediction block of the PU of the CU to reconstruct the pixel block of the CU. For example, the reconstruction unit 340 may add the sample of the residual block to the corresponding sample of the prediction block to reconstruct the pixel block of the CU, to obtain a reconstructed picture block.

The in-loop filter unit 350 may perform a deblocking filtering operation to reduce blocking effects of pixel blocks associated with the CUs.

The video decoder 300 may store the reconstructed picture of the CU in the decoded picture buffer 360. The video decoder 300 may use the reconstructed picture in the decoded picture buffer 360 as a reference picture for subsequent prediction, or transmit the reconstructed picture to a display device for presentation.

As can be seen from the above-mentioned FIG. 2 and FIG. 3, the basic flows for encoding and decoding the video are as follows. At the encoding end, a frame of picture is partitioned into blocks, and for the current block, the prediction unit 210 uses intra prediction or inter prediction to generate a prediction block of the current block. The residual unit 220 may calculate a residual block based on the prediction block and the original block of the current block, for example, subtracting the prediction block from the original block of the current block to obtain the residual block which may also be referred to as residual information. The residual block is transformed and quantized through the transform/quantization unit 230 to remove information insensitive to human eyes, so as to eliminate visual redundancy. Optionally, the residual block before being transformed and quantized by the transform/quantization unit 230 may be referred to as a time domain residual block, and the time domain residual block after being transformed and quantized by the transform/quantization unit 230 may be referred to as a frequency residual block or a frequency domain residual block. The entropy encoding unit 280 receives the quantized transform coefficients outputted by the transform quantization unit 230 and may entropy-encode the quantized transform coefficients to output a bitstream. For example, the entropy encoding unit 280 may eliminate character redundancy based on the target context model and probability information of the binary bitstream.

At the decoding end, the entropy decoding unit 310 may parse the bitstream to obtain prediction information, quantization coefficient matrix, etc. of the current block, and the prediction unit 320 uses intra prediction or inter prediction for the current block based on the prediction information to generate a prediction block of the current block. The inverse quantization transform unit 330 performs the inverse quantization and inverse transform on the quantization coefficient matrix by using the quantization coefficient matrix obtained from the bitstream to obtain a residual block. The reconstruction unit 340 adds the prediction block and the residual block to obtain a reconstructed block. The reconstructed blocks constitutes a reconstructed picture. The in-loop filter unit 350 performs in-loop filtering on the reconstructed picture based on the picture or on the blocks to obtain a decoded picture. The encoding end also needs similar operations to the decoding end to obtain decoded picture. The decoded picture may also be referred to as a reconstructed picture, and the reconstructed picture may serve as a reference frame for inter prediction for subsequent frames.

It should be noted that the block partition information, mode information or parameter information such as prediction, transform, quantization, entropy coding and in-loop filter, etc., determined by the encoding end are carried in the bitstream when necessary. The decoding end determines the same block partition information, mode information or parameter information (such as prediction, transform, quantization, entropy coding, in-loop filter) as the encoding end by parsing the bitstream and analyzing based on the existing information, so as to ensure that the decoded picture obtained by the encoding end is the same as the decoded picture obtained by the decoding end.

The current block may be a current coding unit (CU) or a current prediction unit (PU) or the like.

The above is the basic flows of the video codec under the block-based hybrid coding framework. With the development of technology, some modules or steps of the framework or the flow may be optimized. The present disclosure is applicable to the basic flows of the video codec under the block-based hybrid coding framework, but is not limited to the framework and the flows.

It can be seen from the above that when encoding, the general hybrid coding framework will first predict by using the spatial or temporal correlations to obtain a picture that is the same or similar to the current block. For a block, it is possible that the prediction block is exactly the same as the current block, but it is difficult to guarantee that for all blocks in a video, the prediction block is exactly the same as the current block, especially for a natural video, or a video taken by camera, because of the noise. Moreover, irregular motion, distortion, occlusion, brightness and other changes in video are difficult to be completely predicted. Therefore, in the hybrid coding framework, the prediction picture is subtracted from the original picture of the current block to obtain the residual picture, or the prediction block is subtracted from the current block to obtain the residual block. The residual block is usually much simpler than the original picture, so the prediction can significantly improve compression efficiency. The residual block is not encoded directly, but usually transformed first. The transform is to transform the residual picture from the spatial domain to the frequency domain to remove the correlation of the residual picture. After the residual picture is transformed into frequency domain, the energy is mostly concentrated in the low frequency region, and the transformed non-zero coefficients are mostly concentrated in the top-left corner. Next, quantization is used for further compression. Moreover, because the human eye is insensitive to high frequency, a larger quantization step may be used in the high frequency region.

After the Discrete Cosine Transform (DCT) is performed on the original image, there are non-zero coefficients in the top-left corner region.

The DCT is the most commonly used transform in video compression standards, which includes DCT-II, DCT-VIII, DST-VII, etc.

The basic formula of the DCT-II transform is shown in formula (1):

$$T_i(j) = \omega_0 \cdot \sqrt{\frac{2}{N}} \cdot \cos\left(\frac{\pi \cdot i \cdot (2j+1)}{2N}\right) \tag{1}$$

$$\omega_0 = \begin{cases} \sqrt{\frac{2}{N}} & i = 0 \\ 1 & i \neq 0 \end{cases}$$

$T_i(j)$ is the transformed coefficient, N is the number of points of the original signal, i, j=0, 1, . . . , N−1, $\omega_0$ is the compensation coefficient.

The basic formula of the DCT-VIII transform is shown in formula (2):

$$T_i(j) = \sqrt{\frac{4}{2N+1}} \cdot \cos\left(\frac{\pi \cdot (2i+1) \cdot (2j+1)}{4N+2}\right) \tag{2}$$

The basic formula for the DST-VII transform is shown in formula (4):

$$T_i(j) = \sqrt{\frac{4}{2N+1}} \cdot \sin\left(\frac{\pi \cdot (2i+1) \cdot (j+1)}{2N+1}\right) \tag{3}$$

Because the pictures are all two-dimensional, and the computation and memory overhead of direct two-dimensional transform are unacceptable under the hardware conditions at that time, when using the above-mentioned DCT-II, DCT-VIII and DST-VII for transform in the standard, the transform is split into the horizontal direction and the vertical direction, and a two-step one-dimensional transform is performed. For example, the horizontal direction transform is performed first before the vertical direction transform is performed, or the vertical direction transform is performed first before the horizontal direction transform is performed.

The above transform method is effective for textures in the horizontal direction and the vertical direction, and it is very useful to improve compression efficiency. However, the above transform method has poor effect on textures in the oblique direction. Therefore, with the increasing demand for compression efficiency, if the textures in the oblique direction can be processed more effectively, the compression efficiency can be further improved.

In order to process the residual of the textures in the oblique direction more effectively, the secondary transform is used at present, that is, after the primary transform such as DCT-II, DCT-VIII, DST-VII, etc., the secondary transform is performed on the frequency domain signal, the signal is transformed from one transform domain to another transform domain, and then quantization, entropy coding and other operations are performed to further remove statistical redundancy.

The low frequency non-separable transform (LFNST) is a reduced secondary transform. On the encoding end, the LFNST is used after the primary transform and before the quantization. At the decoding end, the LFNST is used after the inverse quantization and before the inverse primary transform.

Figure 4:
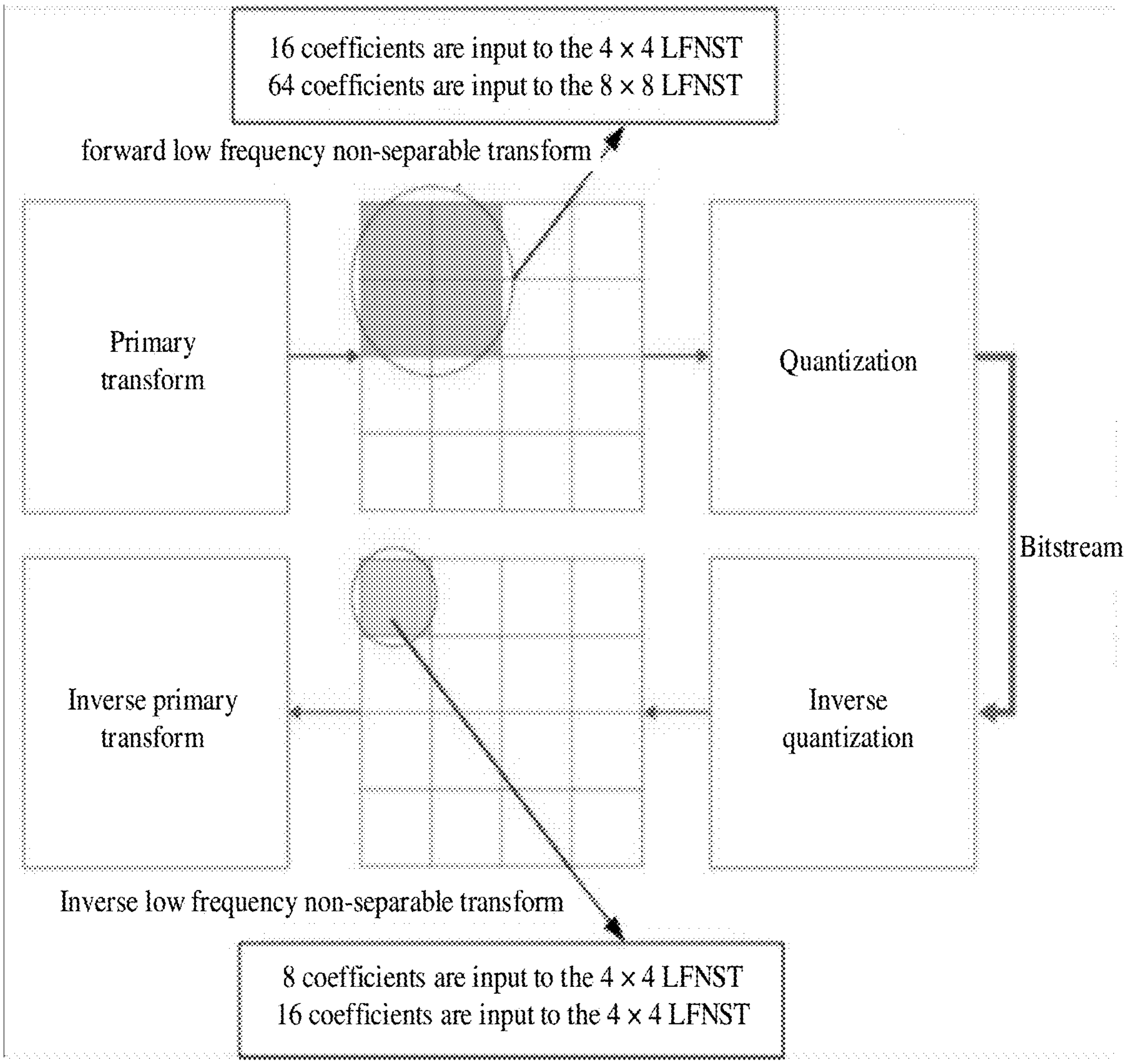
FIG. 4 is a schematic diagram of a low frequency non-separable transform (LFNST).

As illustrated in FIG. 4, at the encoding end, the LFNST is used to perform the secondary transform on the low frequency coefficients in the top-left corner after the primary transform. The primary transform concentrates the energy in the top-left corner by removing the correlation for the picture. The correlation of the low frequency coefficients of the primary transform is removed through the secondary transform. At the encoding end, 16 coefficients are input to the 4×4 LFNST transform core, and the output is 8 coefficients; and 64 coefficients are input to the 8×8 LFNST transform core, and the output is 16 coefficients. At the decoding end, 8 coefficients are input to the 4×4 inverse LFNST transform core, and the output is 16 coefficients; and 16 coefficients are input to the 8×8 inverse LFNST transform core, and the output is 64 coefficients.

Figure 6:
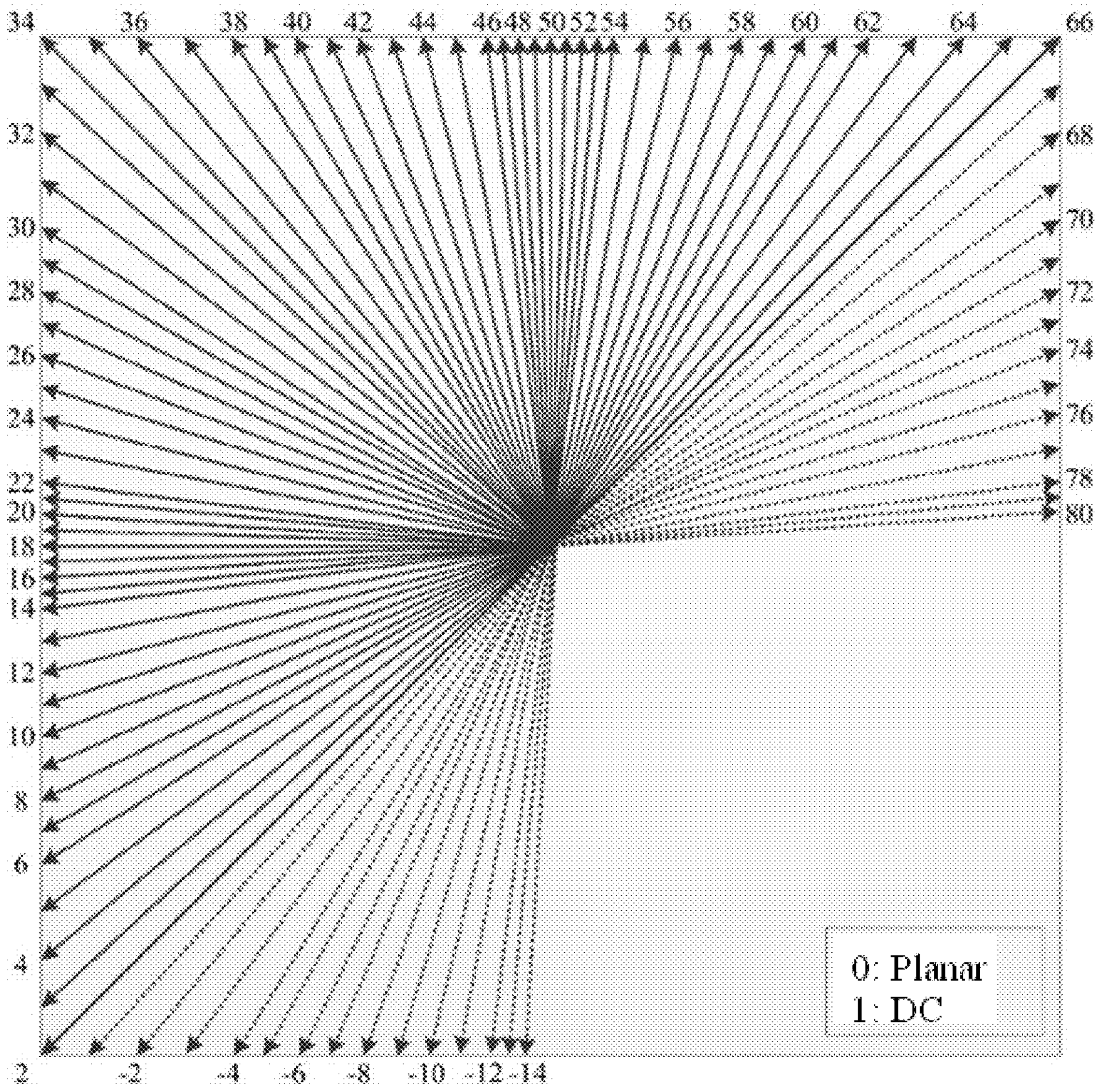
FIG. 6 is a schematic diagram of another intra prediction mode.

Optionally, the LFNST includes four types of transform cores, and the primary picture of these four types of transform cores is illustrated in FIG. 6. Some obvious textures in the oblique direction may be seen. In some embodiments, a type of transform cores is also referred to as a set of transform cores.

At present, the LFNST is only applied to intra-coded blocks. The intra prediction uses the reconstructed pixels around the current block as a reference to predict the current block. Since the current video is encoded from left to right and from top to bottom, the reference pixels available for the current block are usually on the left and top sides.

Figure 5:
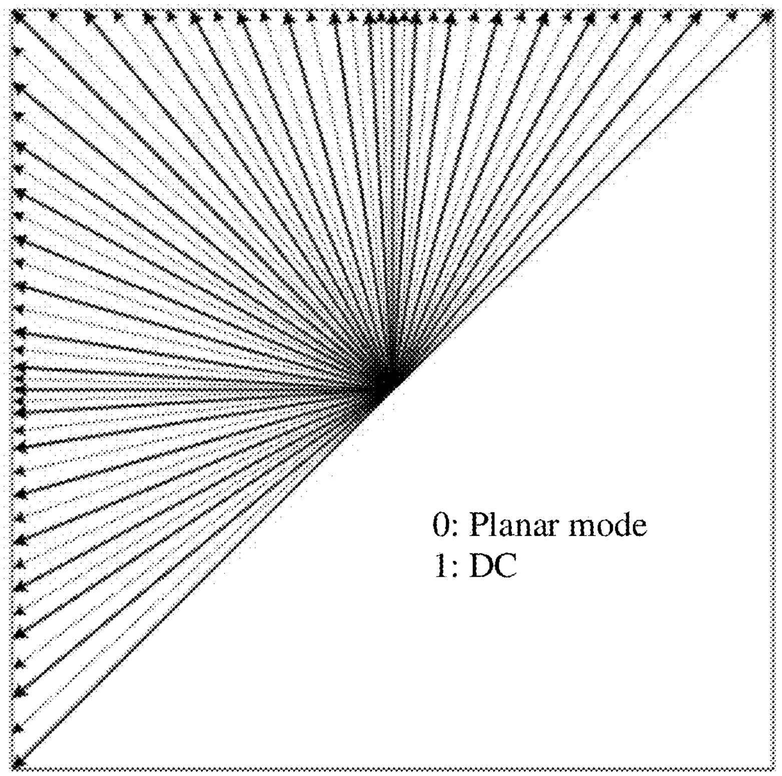
FIG. 5 is a schematic diagram of an intra prediction mode.

As illustrated in FIG. 5, the VVC has 67 intra prediction modes, including 65 angular prediction modes in addition to 0 Planar and 1DC. The Planar usually processes some textures with gradients, the DC usually processes some flat regions as its name implies, and angular intra prediction is usually used for blocks with obvious angular textures. Of course, VVC may also use a wide-angle prediction mode for non-square blocks, the wide-angle prediction mode makes the predicted angular range larger than the predicted angular range for square blocks. As illustrated in FIG. 6, 2-66 are the angles corresponding to the prediction modes for square blocks, and −1 to −14 and 67-80 represent the expanded angles in the wide-angle prediction modes.

In the angular prediction, the reference pixels are tiled onto the current block based on the specified angular to generate the prediction value, which means that the prediction block will have obvious directional textures. The residual of the current block after angular prediction will also show obvious angular characteristics statistically. Therefore, the transform core selected by the LFNST may be bound with the intra prediction mode, that is, after the intra prediction mode is determined, the LFNST can only use a set of transform cores or a type of transform cores corresponding to the intra prediction mode. In some embodiments, a type of transform cores is also called a set of transform cores, and a type of transform cores includes at least two transform cores.

Specifically, the LFNST in the VVC has a total of 4 types of transform cores, and each type of transform core includes at least 2 transform cores. The correspondences between intra prediction modes and the types of transform cores is illustrated in Table 1.

TABLE 1

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

In the Table 1, IntraPredMode represents the intra prediction mode, and Tr.set index represents the index of a type of transform cores.

It should be noted that the cross-component prediction modes used in chroma intra prediction are 81 to 83, while these modes are not available for the luma intra prediction.

The transform core of the LFNST may be transposed to process more angular by using a set of transform cores. For example, in the Table 1, modes 13 to 23 and 45 to 55 all correspond to the type 2 of transform cores, but modes 13 to 23 are obviously close to the horizontal mode, and modes 45 to 55 are obviously close to the vertical mode. The coefficients before the transforms and the coefficients after the inverse transforms corresponding to modes 45 to 55 need to be transposed for matching.

The LFNST of the VVC has 4 types of transform core.

In some scenarios, the types of transform cores are expanded to more, for example, 35 types of transform cores, with 3 transform cores in each type. The Planar mode corresponds to the type 0 of transform cores, the DC mode corresponds to the type 1 of transform cores, the angular 2 and angular 66 correspond to the type 2 of transform cores, the angular 3 and angular 65 correspond to the type 3 of transform cores, . . . the angular 33 and angular 35 correspond to the type 34 of transform cores, angular 34 corresponds to the type 35 of transform cores. When the angular is greater than or equal to the angular 35, the coefficients before the secondary transform need to be transposed for the input; similarly, the coefficients after the inverse secondary transform also need to be transposed for the output.

As can be seen from the above, it is possible to specify which type of transform cores to use based on the intra prediction mode by binding the intra prediction mode and the type of transform cores. In this way, by using the correlation between the intra prediction modes and the transform cores, the transmission of the selection information of the transform cores in the bitstream is reduced, thereby saving bits. However, whether the current block uses the secondary transform, and in case that the current block uses the secondary transform, whether to use the first transform core or a second transform core of a type of transform cores need to be determined by the bitstream and some conditions.

The ECM is a tool to further improve the performance of the VVC and a reference software for the combination of tools. It is based on VTM-10.0 and integrates the tools and technologies adopted by EE.

In the intra encoding of the ECM, similar to VTM (which is a reference software test platform of the VVC), there are traditional intra prediction, residual transform and other processes. Different from the VVC, during the intra prediction, two technologies (i.e., Decoder-side Intra Mode Derivation (DIMD) and Template-based Intra Mode Derivation (TIMD)) are adopted to derive intra prediction modes.

The DIMD and TIMD technologies can derive intra prediction mode at decoding end, thus omitting the encoding of the indexes of intra prediction modes, so as to save code words.

Figure 7A:
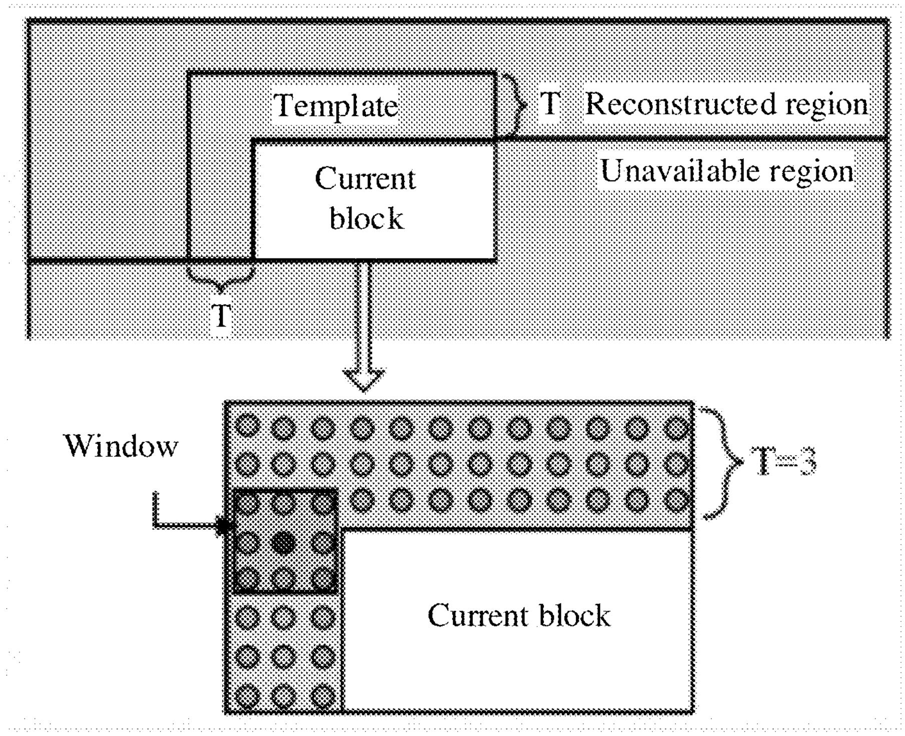
FIG. 7A is a prediction schematic diagram of Decoder-side Intra Mode Derivation (DIMD).

As illustrated in FIG. 7A, the DIMD takes the reconstructed pixel values around the current block as a Template, scanning is performed on each 3×3 region on the Template by sobel operator, and gradients in the horizontal direction and the vertical direction are calculated, and gradients Dx and Dy in the horizontal direction and the vertical direction are obtained. The amplitude value amp=Dx+Dy and the angular value angular=arctan (Dy/Dx) at each position are obtained based on the Dx and Dy. The angular of each position on the template corresponds to the traditional angular prediction mode, and the amplitude value of the same angular mode is accumulated to obtain a histogram of the amplitude values and the angular modes as illustrated in FIG. 7B.

Figure 7B:
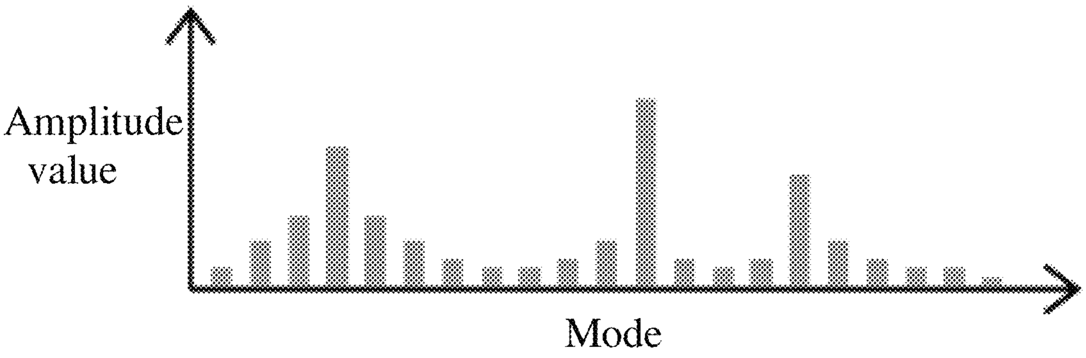
FIG. 7B is a histogram of amplitude values and prediction modes of the DIMD.

The final prediction result of the DIMD may be obtained by weighting the prediction values of the two angular modes with the maximum and second maximum amplitude values and the planar mode in FIG. 7B. In the current ECM, the weighting process is illustrated in formulas (4) and (5):

$$w0 = \frac{1}{3},\ w1 = \frac{2}{3} \times \frac{amp1}{amp1 + amp2},\ w2 = \frac{2}{3} \times \frac{amp2}{amp1 + amp2} \tag{4}$$

$$Pred = Pred_{planar} \times w0 + Pred_{mode1} \times w1 + Pred_{mode2} \times w2 \tag{5}$$

Herein, w0, w1 and w2 are the weights assigned to the planar mode, the angular mode with the maximum amplitude value and the angular mode with the second maximum amplitude value, respectively, $Pred_{planar}$ is the prediction value corresponding to the planar mode, $Pred_{mode1}$ is the prediction value corresponding to the angular mode with the maximum amplitude value, and $Pred_{mode2}$ is the prediction value corresponding to the angular mode with the second maximum amplitude value. Pred is the weighted prediction value corresponding to the DIMD, amp1 is the amplitude value of the angular mode with the maximum amplitude value and amp2 is the amplitude value of the angular mode with the second maximum amplitude value.

The TIMID is basically the same as the DIMD, and the intra prediction mode is derived by using the reconstructed pixel values around the current block.

Figure 8:
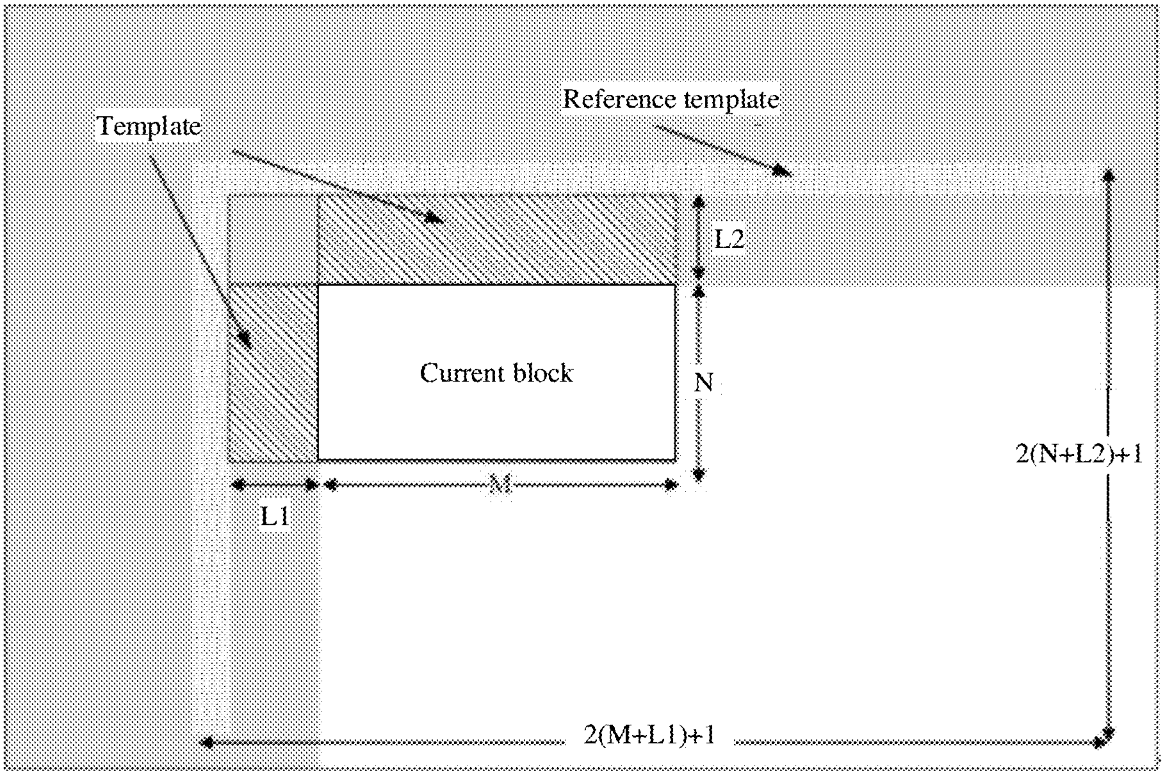
FIG. 8 is a schematic diagram of Template-based Intra Mode Derivation (TIMD) prediction.

As illustrated in FIG. 8, the TIMID derives a list of Most Probable Mode (MPM) through the intra prediction modes selected by five blocks, i.e., the top block, the left block, the top-left block, the bottom-left block and the top-right block of the current block. As illustrated in FIG. 8, prediction results are made for the template regions, respectively, with the reconstructed values in the reference of the template as reference rows. The Sum of absolute transformed differences (SATD) between the reconstructed value of the template and the prediction result of each mode is calculated respectively. The two modes with the minimum SATD and the second minimum SATD are taken as the prediction modes of the current block for prediction and weight.

It is assumed that angular mode 1 is the angular mode with the minimum SATD, and its SATD is cost1, and the angular mode 2 is the angular mode with the second minimum SATD, and its SATD is cost2.

When cost1*2>cost2, the weighting method is illustrated in formulas (6) and 7

$$w1 = \frac{\text{cost}\,2}{\text{cost}\,1 + \text{cost}\,2},\ w2 = \frac{\text{cost}\,1}{\text{cost}\,1 + \text{cost}\,2} \tag{6}$$

$$Pred = Pred_{mode1} \times w1 + Pred_{mode2} \times w2 \tag{7}$$

When cost1*2≤cost2, it is determined that the current block does not adopt the weighted prediction mode.

Herein, $Pred_{mode1}$ is the prediction value corresponding to the angular mode with the minimum SATD, $Pred_{mode2}$ is the prediction value corresponding to the angular mode with the second minimum SATD, Pred is the weighted prediction value corresponding to the TIMD, w1 is the weight corresponding to the angular mode with the minimum SATD and w2 is the weight corresponding to the angular mode with the second minimum SATD.

In some embodiments, in the DIMD technology, the transform core of the secondary transform corresponding to the angular mode with the maximum amplitude value is defaulted to the target transform core of the current block. In the TIMD technology, the transform core of the secondary transform corresponding to the angular mode with the minimum SATD is defaulted to the target transform core of the current block.

However, at present, the transform core of the secondary transform is fixed to select the transform core corresponding to a certain intra prediction mode, which makes the selection of the transform core of the secondary transform inflexible and the transform effect poor, and then leads to the overall performance of encoding and decoding is not ideal.

In order to solve the above technical problems, in the present disclosure, the target transform core corresponding to the current block is selected from the preset M types of transform cores of the secondary transform, instead of fixedly selecting the transform core corresponding to a certain mode, so that the selection flexibility of the transform core is improved, the transform effect is improved, and the overall performance of encoding and decoding is improved.

It should be noted that the method for encoding and decoding video according to the embodiments of the present disclosure may be applied not only to the TIMD and DIMD technologies, but also to any scenarios of encoding and decoding video that allow using the weighted prediction mode and the secondary transform mode.

The methods for encoding and decoding video according to the embodiments of the present disclosure are described below in combination with specific embodiments.

Figure 9:
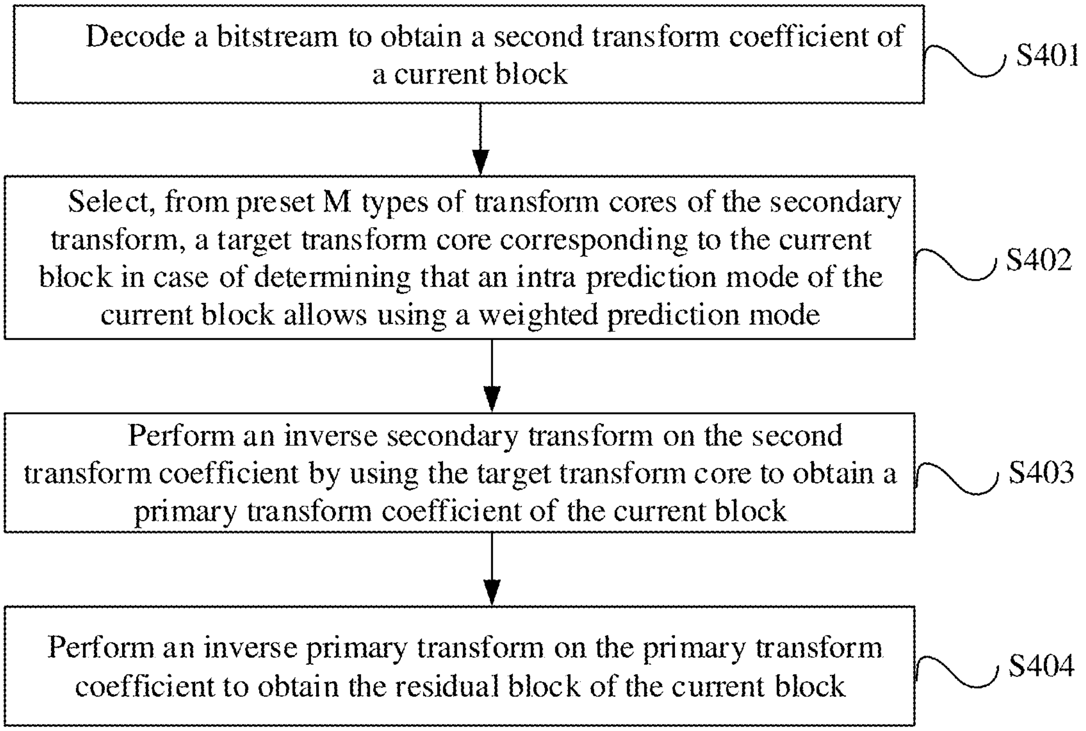
FIG. 9 is a flowchart of the method for decoding video according to an embodiment of the present disclosure.

Firstly, taking the decoding end as an example, the method for decoding video according to the embodiment of the present disclosure is introduced in combination with FIG. 9.

Figure 10:
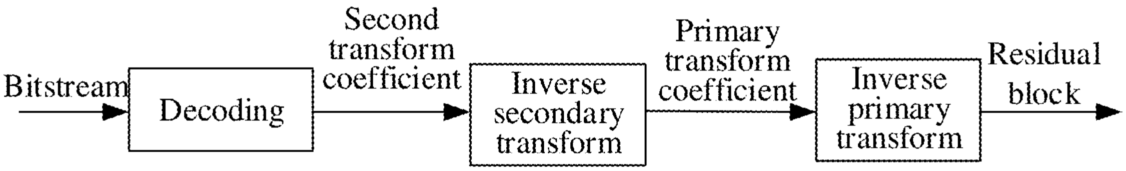
FIG. 10 is a schematic diagram of processes for decoding video according to an embodiment of the present disclosure.

FIG. 9 is a flowchart of the method for decoding video according to the embodiment of the present disclosure. FIG. 10 is a schematic diagram of processes for decoding video according to the embodiment of the present disclosure. Embodiments of the present disclosure are applied to the video decoders illustrated in FIG. 1 and FIG. 2. As illustrated in FIG. 9 and FIG. 10, the method of the embodiment of the present disclosure includes the following operations.

In operation S401, a bitstream is decoded to obtain the second transform coefficient of a current block.

In some embodiments, the current block may also be referred to as a current coding block, a current coding unit, a coding block, a to-be-decoded block, a to-be-decoded current block, etc.

In some embodiments, the current block may be referred to as a chroma block when the current block includes a chroma component and does not include a luma component.

In some embodiments, the current block may be referred to as a luma block when the current block includes a luma component and does not include a chroma component.

The second transform coefficient is a transform coefficient formed through performing the secondary transform on a residual block of the current block by an encoding end. Specifically, the encoding end performs the primary transform on the residual block of the current block to obtain the primary transform coefficient, and then performs the secondary transform on the primary transform coefficient to obtain the second transform coefficient of the current block.

In some embodiments, the primary transform is also referred to as the first transform, an initial transform or a base transform or the like.

In some embodiments, the secondary transform is also referred to as the second transform, etc.

In some embodiments, the primary transform coefficient is also referred to as the initial transform coefficient, the base primary transform coefficient, the first transform coefficient or the coefficient after the first transform, etc.

In some embodiments, the second transform coefficient is also referred to as the secondary transform coefficient or the coefficient after the secondary transform or the like.

In this embodiment, the operation in S401 of the decoding end decodes the bitstream to obtain the second transform coefficient of the current block includes but not limited to the following manners.

In a first manner, in case that the encoding end does not perform quantization on the second transform coefficient during encoding, but directly encodes the second transform coefficient to obtain the bitstream, the decoding end decodes the bitstream, and directly obtains the second transform coefficient of the current block from the bitstream.

In a second manner, in case that the encoding end performs quantization on the second transform coefficient during encoding to obtain the quantization coefficient, and then encodes the quantization coefficient to obtain the bitstream, the decoding end decodes the bitstream to obtain the quantization coefficient of the current block, and performs the inverse quantization on the quantization coefficient to obtain the second transform coefficient of the current block.

In operation S402, in case of determining that the intra prediction mode of the current block allows using a weighted prediction mode, a target transform core corresponding to the current block is selected from preset M types of the transform cores of the secondary transform. M is a positive integer greater than 1.

In the embodiment of the present disclosure, the type of the intra prediction mode of the current block includes a single prediction mode (i.e. a non-weighted prediction mode, such as an angular prediction mode or a non-angular prediction mode), and may also include a weighted prediction mode.

The weighted prediction mode means that at least two intra prediction modes are used to respectively predict the current block, and the prediction values corresponding to the at least two prediction modes are weighted, and the weighted result is taken as the prediction value of the current block. For example, the weighted prediction mode includes an angular prediction mode 1 and an angular prediction mode 2. The current block is predicted by using the angular prediction mode 1 to obtain a prediction value 1, the current block is predicted by using the angular prediction mode 2 to obtain a prediction value 2, the prediction value 1 and the prediction value 2 are weighted, and the weighted result is determined as the prediction value of the current block.

In some embodiments, it may be determined whether the current block allows using the weighted prediction mode by the following manners.

In a first manner, the bitstream includes a flag a indicating whether the current block allows using the weighted prediction mode. The decoding end obtains the flag a by decoding the bitstream, and judges whether the current block allows using the weighted prediction mode based on the value of the flag a. For example, when the value of the flag a is the first value (for example, 1), it is determined that the current block allows using the weighted prediction mode, and when the value of the flag a is the second value (for example, 0), it is determined that the current block does not allow using the weighted prediction mode. Optionally, the flag a may be a sequence-level flag, a frame-level flag, a macroblock-level flag or a coding block-level flag.

In a second manner, the bitstream does not carry the flag a, but whether the current block allows using the weighted prediction mode is determined through the default manner. For example, if it is defaulted that the current sequence, the current frame, the current macroblock or the current block does not allow using the weighted prediction mode, it is determined that the current block does not allow using the weighted prediction mode. If it is defaulted that the current sequence, the current frame, the current macroblock or the current block allows using the weighted prediction mode, it is determined that the current block allows using the weighted prediction mode.

In case of determining that the intra prediction mode of the current block allows using the weighted prediction mode, the implementation manners in the operation S402 of selecting the target transform core corresponding to the current block from the preset M types of the transform cores of the secondary transform includes but are not limited to the following manners.

In a first manner, the bitstream includes an indication flag, and the target transform core corresponding to the current block is selected based on the indication flag. Specifically, the operation S402 of selecting the target transform core corresponding to the current block from the preset M types of the transform cores of the secondary transform includes the following operations S402-A1 and S402-A2.

In operation S402-A1, the bitstream is decoded to obtain the first flag for indicating that the target transform core is a transform core corresponding to a target prediction mode.

In operation S402-A2, the transform core corresponding to the target prediction mode in the M types of the transform cores of the secondary transform is determined as the target transform core based on the first flag.

In the above first manner, after determining the target transform core corresponding to the current block and performing secondary transform on the residual block of the current block by using the target transform core, the encoding end signals the first flag in the bitstream, and the first flag is used for indicating that the target transform core is the transform core corresponding to the target prediction mode. In this way, the decoding end receives the bitstream, decodes the bitstream to obtain the first flag, and determines the transform core corresponding to the target prediction mode in the M types of the transform cores of the secondary transform as the target transform core based on the first flag. For example, the first flag indicates that the target transform core of the secondary transform corresponding to the current block is the transform core corresponding to the prediction mode 1, and the decoding end inquiries the transform core 1 corresponding to the prediction mode 1 from the M types of the transform cores of the secondary transform, takes the transform core 1 as the target transform core corresponding to the current block, and uses the target transform core to perform the inverse secondary transform on the second transform coefficient of the current block to obtain the primary transform coefficient of the current block.

In the embodiment of the present disclosure, the specific value of M is not limited, for example, M=4 or M=35.

In some embodiments, the above target prediction mode belongs to the intra prediction mode of the current block. For example, the intra prediction mode of the current block is a weighted prediction mode, and the weighted prediction mode includes N intra prediction modes (for example, including two angular modes and the Planar mode), then the target prediction mode is one of the N intra prediction modes.

In some embodiments, the target prediction mode does not belong to the intra prediction mode of the current block. For example, the intra prediction mode of the current block is a non-weighted prediction mode, for example, the intra prediction mode of the current block is the Planar mode, while the target prediction mode is a non-Planar mode such as the DC mode or the angular mode.

Based on this, in the above operation S402-A2, when determining the target transform core based on the first flag, it is also necessary to determine the intra prediction mode of the current block, that is, the above operation S402-A2 includes the following operations S402-A21 to S402-A23.

In operation S402-A21, the intra prediction mode of the current block is determined.

The intra prediction mode of the current block includes the weighted prediction mode and the non-weighted prediction mode.

If the intra prediction mode of the current block is the weighted prediction mode, N intra prediction modes included in the weighted prediction mode are continuously determined, and N is a positive integer greater than 1. For example, the weighted prediction mode corresponding to the DIMD includes two angular modes with the maximum amplitude value and the second maximum amplitude value and the planar mode, that is, N=3. The weighted prediction mode of the TIMD includes two modes with the minimum SATD and the second minimum SATD, that is, N=2.

If the intra prediction mode of the current block is the non-weighted prediction mode, the current block only includes one intra prediction mode, for example, the mode with the minimum rate distortion cost is selected as the intra prediction mode of the current block from the Planar mode, DC mode and 65 angular modes.

In operation S402-A22, the target prediction mode is determined based on the intra prediction mode of the current block and the first flag.

In operation S402-A23, the transform core corresponding to the target prediction mode in the M types of the transform cores of the secondary transform is determined as the target transform core.

In the present disclosure, the manners for determining the target prediction mode based on the first flag differs depending on whether the intra prediction mode of the current block is a weighted prediction mode.

In the first situation, if the intra prediction mode of the current block is the weighted prediction mode and the weighted prediction mode includes N intra prediction modes, the above operation S402-A22 includes the operation S402-A221.

In operation S402-A221, a prediction mode, indicated by the first flag, in the N intra prediction modes is determined as the target prediction mode.

For example, the weighted prediction mode of the current block includes two angular modes with the maximum amplitude value and the second maximum amplitude value and the planar mode. It is assumed that the first flag indicates that the target transform core is the transform core corresponding to the planar mode, the planar mode is determined as the target prediction mode, and the transform core corresponding to the planar mode in the M types of the transform cores of the secondary transform is determined as the target transform core corresponding to the current block.

In one example, the above target prediction mode is one of the N intra prediction modes.

In another example, the target prediction mode is one of P intra prediction modes, the P intra prediction modes are intra prediction modes related to a selection of a transform core of the secondary transform of the current block in the N intra prediction modes, and P is a positive integer greater than 1 and less than or equal to N. For example, the N intra prediction modes include mode 1, mode 2 and mode 3, but the intra prediction modes related to the selection of the transform core of the secondary transform of the current block are the mode 1 and the mode 2, so that it may be determined that the target prediction mode is one of the mode 1 and the mode 2.

Optionally, if the selection of the transform core of the secondary transform of the current block is related to an angular prediction mode, the P intra prediction modes are angular prediction modes in the N intra prediction modes. Taking the DIMD as an example, the weighted prediction mode corresponding to the DIMD include two angular modes with the maximum amplitude value and the second maximum amplitude value and the planar mode, and P intra prediction modes include two angular modes with the maximum amplitude value and the second maximum amplitude value.

Optionally, if the selection of the transform core of the secondary transform of the current block is related to the N intra prediction modes of the current block, the P intra prediction modes are the N intra prediction modes. Taking the DIMD as an example, the weighted prediction mode corresponding to the DIMD include two angular modes with the maximum amplitude value and the second maximum amplitude value and the planar mode, and the P intra prediction modes include two angular modes with the maximum amplitude value and the second maximum amplitude value and the planar mode.

In the second situation, if the intra prediction mode of the current block is the non-weighted prediction mode, that is, the current block includes an intra prediction mode, the above operation S402-A22 includes the operation S402-A222.

In operation S402-A222, the target prediction mode is determined based on the value of the first flag.

In the above second situation, if the weighted mode is not selected for the current block, for example, in the ECM, if the amplitude value of each angular in the amplitude value histogram derived by template is 0, DIMD is not weighted, and the prediction result of the planar is directly used. In this way, the current block uses a prediction mode (such as the planar prediction mode) for prediction. In order to increase the flexibility of selecting the target transform core, the first flag is assigned different values to indicate that the decoding end may select a transform core other than the transform core corresponding to the planar prediction.

Based on this, the implementation manners of the above operation S402-A222 include but are not limited to the following manners.

In a first manner, if the value of the first flag is the first value, it is determined that the target prediction mode is the intra prediction mode of the current block.

For example, if the intra prediction mode of the current block is the Planar mode and the value of the first flag is the first value, it is determined that the target prediction mode is the Planar mode, and the transform core corresponding to the Planar mode is taken as the target transform core corresponding to the current block.

In a second manner, if the value of the first flag is the second value, it is determined that the target prediction mode is the second intra prediction mode different from the intra prediction mode of the current block.

In the above second manner, the specific type of the second intra prediction mode is not limited, and the second intra prediction mode is only different from the intra prediction mode of the current block.

Exemplarily, if the intra prediction mode of the current block is the Planar mode, the second intra prediction mode is the DC Mode, and the DC Mode has a selection probability slightly lower than a selection probability of the Planar mode when prediction. The transform core corresponding to the second intra prediction mode is used as the target transform core corresponding to the current block.

Exemplarily, if the intra prediction mode of the current block is a non-Planar mode, the second intra prediction mode is the Planar mode. For example, when the intra prediction mode of the current block is the DC mode, the second intra prediction mode is the Planar mode. The transform core corresponding to the second intra prediction mode is used as the target transform core corresponding to the current block.

In some embodiments, before performing the operation S402-A1 of decoding the bitstream to obtain the first flag, the decoding end first judges whether the selection of the target transform core use the manner provided by the embodiment of the present disclosure. Specifically, the decoding end determines that the intra prediction mode of the current block is the weighted prediction mode and the weighted prediction mode includes N intra prediction modes; performs the prediction process, i.e., determines the prediction value corresponding to each intra prediction mode in the N intra prediction modes, and determines the weights when the prediction values corresponding to the N intra prediction modes are weighted. If the ratio between the minimum weight and the maximum weight which correspond to the N intra prediction modes is greater than the preset value, the operation S402-A1 of decoding bit stream to obtain the first flag is performed.

For example, for the TIMD, it is assumed that mode1 and mode2 are two modes with minimum cost, and their cost values are cost1 and cost2 respectively. From the above formulas (6) and (7), it may be seen that the weight of mode1 is positively correlated with cost2, and the weight of mode2 is positively correlated with cost1. When cost1/cost2>$\alpha$, $\alpha$ is a preset value and is a positive number (such as 0.8) close to 1, the selection of the transform core at the decoding end is the target transform core indicated by the first flag, and then performs the operation S402-A1 of decoding the bitstream to obtain the first flag. This is because when cost1 is much less than cost2, the weights of the mode 1 and the mode 2 are quite different, which leads to the prediction result being almost the same as that of mode1. In this way, there is no need to further consider the transform core corresponding to the mode2.

For the above operation S402 of selecting the target transform core corresponding to the current block from the preset M types of the transform cores of the secondary transform, the implementation manners further include the following the second manner and the third manner, in addition to the above first manner of determining the target transform core based on the first flag.

In a second manner, if the intra prediction mode of the current block is a weighted prediction mode and the weighted prediction mode includes N intra prediction modes, transform cores of the secondary transform corresponding to the N intra prediction modes are determined from the preset M types of the transform cores of the secondary transform. The rate distortion costs are determined when decoding by using the transform cores of the secondary transform corresponding to the N intra prediction modes. The transform core of the secondary transform with a minimum rate distortion cost is determined as the target transform core corresponding to the current block.

In a third manner, if the intra prediction mode of the current block is the weighted prediction mode and the weighted prediction mode includes N intra prediction modes, rate distortion costs corresponding to the N intra prediction modes are determined. In the M types of transform cores of the secondary transform, the first transform core (corresponding to the intra prediction mode) with the minimum rate distortion cost is inquired. The first transform core is determined as the target transform core corresponding to the current block.

It should be noted that the operation S402 of selecting the target transform core corresponding to the current block from the preset M types of the transform cores of the secondary transform includes but is not limited to the above three manners.

From the above, it can be seen that in the embodiment of the present disclosure, the decoding end selects the target transform core corresponding to the current block from the preset M types of the transform cores of the secondary transform, instead of fixedly using the transform core corresponding to a certain mode, so that the selection flexibility of the transform core is improved, the transform effect is improved and the overall performance of encoding and decoding is improved.

In operation S403, an inverse secondary transform is performed on the second transform coefficient by using the target transform core to obtain a primary transform coefficient of the current block.

According to the above manner, after the target transform core corresponding to the current block is determined, the target transform core is used to perform the inverse secondary transform on the second transform coefficient of the current block to obtain the primary transform coefficient of the current block.

In the embodiments of the present disclosure, the manner for performing the inverse secondary transform on the second transform coefficient based on the transform core of the secondary transform is not limited to.

For example, the coefficient after the inverse secondary transform of the current block is obtained according to the following formula (8):

$$\vec{F} = T \cdot \vec{X} \tag{8}$$

Herein, $\vec{F}$ is the second transform coefficient of the current block; T is the transform core of the secondary transform, which is the transform matrix; and $\vec{X}$ is the coefficient after the inverse secondary transform.

Based on the above formula (8), the inverse secondary transform may be performed on the second transform coefficient based on the transform core of the secondary transform to obtain a coefficient after the inverse secondary transform.

It should be noted that the above formula (8) is only an example, and the implementation manner for the above operation S403 includes but is not limited to the above formula (8).

It can be seen from the above Table 1 that the coefficients before the transforms and the coefficients after the inverse transforms corresponding to some angular modes do not need to be transposed, and some coefficients need to be transposed. For example, modes 13 to 23 and 45 to 55 all correspond to the type 2 of transform cores, but modes 13 to 23 are obviously close to the horizontal mode, and modes 45 to 55 are obviously close to the vertical mode. The coefficients before the transforms and the coefficients after the inverse transforms corresponding to modes 45 to 55 need to be transposed for matching. Based on this, the decoding end needs to further determine whether to transpose the coefficient after the inverse secondary transform based on the target transform mode after performing the inverse secondary transform on the second transform coefficient by using the target transform core. The manner for the decoding end judging whether to transpose the coefficient after the inverse secondary transform includes but not limited to the following manners.

In a first manner, the decoding end judges whether the coefficient after the inverse secondary transform corresponding to the target prediction mode need to be transposed according to the Table 1. For example, if the target prediction mode is one of modes 45 to 55, it is determined that the coefficient after the inverse secondary transform needs to be transposed.

In a second manner, if the intra prediction mode of the current block is the weighted prediction mode, whether the coefficient after the inverse secondary transform needs to be transposed may be judged based on the first flag.

In the above second manner, the decoding end firstly determines the types of the transform cores of the secondary transform corresponding to the P intra prediction modes, and judges the indication information of the first flag based on the types of the transform cores of the secondary transform corresponding to the P intra prediction modes.

For example, if the types of the transform cores of the secondary transform corresponding to the P intra prediction modes are different, the first flag is used for indicating that the target transform core is a transform core corresponding to the target prediction mode. For example, the P intra prediction modes include mode 1 and mode 2, and if the target prediction mode is the mode 1, the first flag indicates that the target transform core is the transform core corresponding to the mode 1. Optionally, the specific value of the first flag may be a mode index of the target prediction mode.

For another example, if the types of the transform cores of the secondary transform corresponding to the P intra prediction modes are identical, the first flag is further used for indicating whether to transpose the transform coefficient after the inverse secondary transform in addition to indicating that the target transform core is the transform core corresponding to the target prediction mode. For example, in the LFNST, the P intra prediction modes include angular mode 2 and angular mode 66, which all correspond to the third type of transform cores, but the difference is whether the coefficients before the transform and after the inverse transform need to be transposed, so the first flag is not used for switching the types of transform cores, but is used for indicating whether transposition is needed.

Based on the above second manner, the operation S403 includes the following operation S403-A.

In operation S403-A, the inverse secondary transform is performed on the second transform coefficient by using the target transform core based on the types of the transform cores of the secondary transforms corresponding to the P intra prediction modes and the first flag, to obtain the primary transform coefficient of the current block.

In a first example, in case of determining that the types of the transform cores corresponding to the P intra prediction modes are different, the inverse secondary transform is performed on the second transform coefficient by using the target transform core indicated by the first flag, and the transform coefficient after the inverse secondary transform is determined as the primary transform coefficient of the current block.

In a second example, in case of determining that the types of the transform cores corresponding to the P intra prediction modes are identical, and the first flag indicates to transpose the transform coefficient after the inverse secondary transform, the inverse secondary transform is performed on the second transform coefficient by using the target transform core, and the transform coefficient after the inverse secondary transform is transposed, and the transposed transform coefficient is determined as the primary transform coefficient of the current block.

In a third example, in case of determining that the types of the transform cores corresponding to the P intra prediction modes are identical, and the first flag indicates that no transpose is performed on the transform coefficient after the inverse secondary transform, the inverse secondary transform is performed on the second transform coefficient by using the target transform core, and the transform coefficient after the inverse secondary transform is determined as the primary transform coefficient of the current block.

Based on the above manners, the inverse secondary transform is performed on the second transform coefficient by using the target transform core to obtain the primary transform coefficient of the current block, and then the following operation S404 is performed.

In operation S404, an inverse primary transform is performed on the primary transform coefficient to obtain the residual block of the current block.

As illustrated in FIG. 10, the inverse secondary transform is performed on the second transform coefficient by using the target transform core to obtain the primary transform coefficient of the current block, and then the inverse primary transform is performed on the primary transform coefficient to obtain the residual block of the current block.

Specifically, based on the manner used in the primary transform, the inverse primary transform is performed on the primary transform coefficient to obtain the residual block of the current block.

In an example, if the encoding end performs the primary transform on the residual block of the current block by using the DCT-II transform manner illustrated in the formula (1), the decoding end performs the inverse primary transform on the primary transform coefficient by using the DCT-II transform manner illustrated in the formula (1) to obtain the residual block of the current block.

In another example, if the encoding end performs the primary transform on the residual block of the current block by using the DCT-VIII transform manner illustrated in the formula (2), the decoding end performs the inverse primary transform on the primary transform coefficient by using the DCT-VIII transform manner illustrated in the formula (2) to obtain the residual block of the current block.

In another example, if the encoding end performs the primary transform on the residual block of the current block by using the DST-VII transform manner illustrated in the formula (3), the decoding end performs the inverse primary transform on the primary transform coefficient by using the DST-VII transform manner illustrated in the formula (3) to obtain the residual block of the current block.

In some embodiments, the intra prediction is performed on the current block based on the intra prediction mode of the current block to obtain the prediction block of the current block. For example, if the intra prediction mode of the current block is the weighted prediction mode, N intra prediction modes included in the weighted prediction mode are used for the weighted prediction. That is, the prediction values corresponding to the N intra prediction modes are weighted to obtain the prediction block of the current block.

Based on the above operations, after obtaining the residual block and the prediction block of the current block, the prediction block and the residual block are added to obtain the reconstructed block of the current block.

In the decoding method of the embodiments of the present disclosure, the second transform coefficient of the current block is obtained by decoding the bitstream, and the second transform coefficient is a transform coefficient formed through performing a secondary transform on the residual block of the current block by the encoding end. In case of determining that the intra prediction mode of the current block allows using the weighted prediction mode, the target transform core corresponding to the current block is selected from the preset M types of transform cores of the secondary transform. M is a positive integer greater than 1. The inverse secondary transform is performed on the second transform coefficient by using the target transform core to obtain the primary transform coefficient of the current block. The inverse primary transform is performed on the primary transform coefficient to obtain the residual block of the current block. That is, in the present disclosure, the decoding end selects a target transform core corresponding to a current block from the preset M types of transform cores of the secondary transform, instead of fixedly selecting a transform core corresponding to a certain mode, so that the selection flexibility of the transform core is improved, the transform effect is improved, and the overall performance of decoding is improved.

Figure 11:
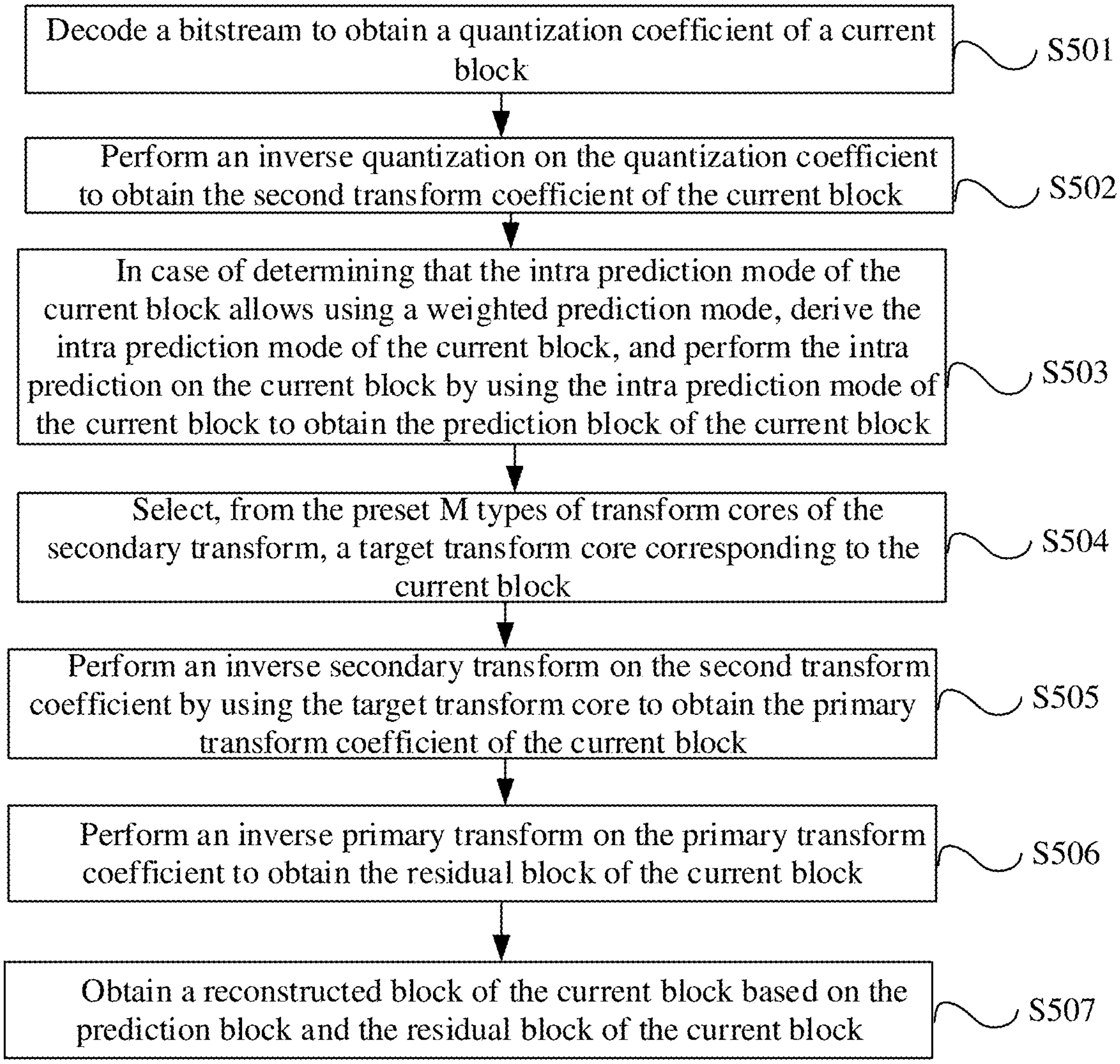
FIG. 11 is another flowchart of the method for decoding video according to an embodiment of the present disclosure.
Figure 12:
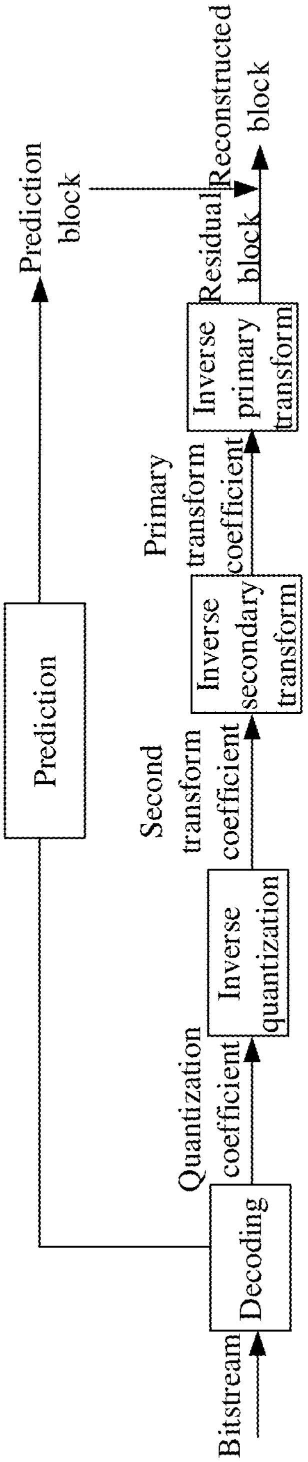
FIG. 12 is a schematic diagram of processes for decoding according to an embodiment of the present disclosure.

FIG. 11 is another flowchart of the method for decoding video according to an embodiment of the present disclosure. FIG. 12 is a schematic diagram of processes for decoding according to an embodiment of the present disclosure. FIG. 11 illustrates detailed processes for decoding according to the embodiment of the present disclosure. As illustrated in FIG. 11 and FIG. 12, the method includes the following operations.

In operation S501, a bitstream is decoded to obtain a quantization coefficient of a current block.

The encoding end performs a quantization on the second transform coefficient transformed through the secondary transform to form the quantization coefficient, and encodes the quantization coefficient to form the bitstream. Accordingly, after receiving the bitstream, the decoding end decodes the bitstream to obtain the quantization coefficient of the current block.

In operation S502, an inverse quantization is performed on the quantization coefficient to obtain the second transform coefficient of the current block.

Specifically, a quantization manner is determined, and an inverse quantization is performed on the quantization coefficient by using the determined quantization manner to obtain the second transform coefficient of the current block.

The manners for the decoding end determining the quantization manner are as follows.

In a first manner, if the bitstream includes the indication information of the quantization manner, the decoding end obtains the indication information of the quantization manner by decoding the bitstream, and determines the quantization manner of the current block based on the indication information of the quantization manner.

In a second manner, the decoding end uses the default quantization manner.

In a third manner, the decoding end uses the same manner as the encoding end to determine the quantization manner of the current block.

In operation S503, in case of determining that the intra prediction mode of the current block allows using a weighted prediction mode, the intra prediction mode of the current block is derived, and the intra prediction is performed on the current block by using the intra prediction mode of the current block to obtain the prediction block of the current block.

The intra prediction mode of the current block includes the weighted prediction mode and a non-weighted prediction mode.

If the intra prediction mode of the current block is the weighted prediction mode, N intra prediction modes included in the weighted prediction mode are derived, and N is a positive integer greater than 1. For example, the weighted prediction mode corresponding to the DIMD include two angular modes with the maximum amplitude value and the second maximum amplitude value and the planar mode, that is, N=3. The weighted prediction mode corresponding to the TIMD includes two modes with the minimum SATD and the second minimum SATD, that is, N=2.

Then, the current block is predicted by using each of the above N intra prediction modes to obtain a prediction value corresponding to each intra prediction mode. The prediction value corresponding to each intra prediction mode is weighted to obtain the prediction block of the current block. For example, for the DIMD, prediction values are weighted by using the above formulas (4) and (5) to obtain the prediction block of the current block. For example, for the TIMD, prediction values are weighted by using the above formulas (6) and (7) to obtain the prediction block of the current block.

In operation S504, a target transform core corresponding to the current block is selected from the preset M types of transform cores of the secondary transform. M is a positive integer greater than 1.

The implementation process of the above operation S504 is basically the same as the implementation process of the operation S402, and thus, the implementation process of the above operation S504 can refer to the description of the above operation S402, and it will not be repeated here.

In operation S505, an inverse secondary transform is performed on the second transform coefficient by using the target transform core to obtain the primary transform coefficient of the current block.

In operation S506, an inverse primary transform is performed on the primary transform coefficient to obtain the residual block of the current block.

The implementation processes of the above operations S505 and S506 are basically the same as the implementation processes of the above operations S403 and S404, and thus the implementation processes of the above operations S505 and S506 can refer to the description of the above operations S403 and S404.

In operation S507, a reconstructed block of the current block is obtained based on the prediction block and the residual block of the current block.

For example, the prediction block and the residual block of the current block are added to obtain the reconstructed block of the current block.

In the method for decoding of the embodiment of the present disclosure, the quantization coefficient of the current block is obtained by decoding the bitstream. The inverse quantization is performed on the quantization coefficient to obtain the second transform coefficient of the current block. In case of determining that the intra prediction mode of the current block allows using the weighted prediction mode, the intra prediction mode of the current block is derived. The intra prediction is performed on the current block by using the intra prediction mode of the current block to obtain the prediction block of the current block. In case of determining that the current block allows using the weighted prediction mode, the target transform core corresponding to the current block is selected from the preset M types of the transform cores of the secondary transform. The inverse secondary transform is performed on the second transform coefficient by using the target transform core to obtain the primary transform coefficient of the current block. The inverse primary transform is performed on the primary transform coefficient to obtain the residual block of the current block. The reconstructed block of the current block is obtained based on the prediction block and the residual block of the current block. That is, in the present disclosure, the decoding end selects a target transform core corresponding to a current block from the preset M types of transform cores of the secondary transform, instead of fixedly selecting a transform core corresponding to a certain mode, so that the selection flexibility of the transform core is improved, the transform effect is improved, and the overall performance of decoding is improved.

The method for decoding of the embodiments of the present disclosure is described above, and on this basis, the method for encoding according to the embodiments of the present disclosure is described below.

Figure 13:
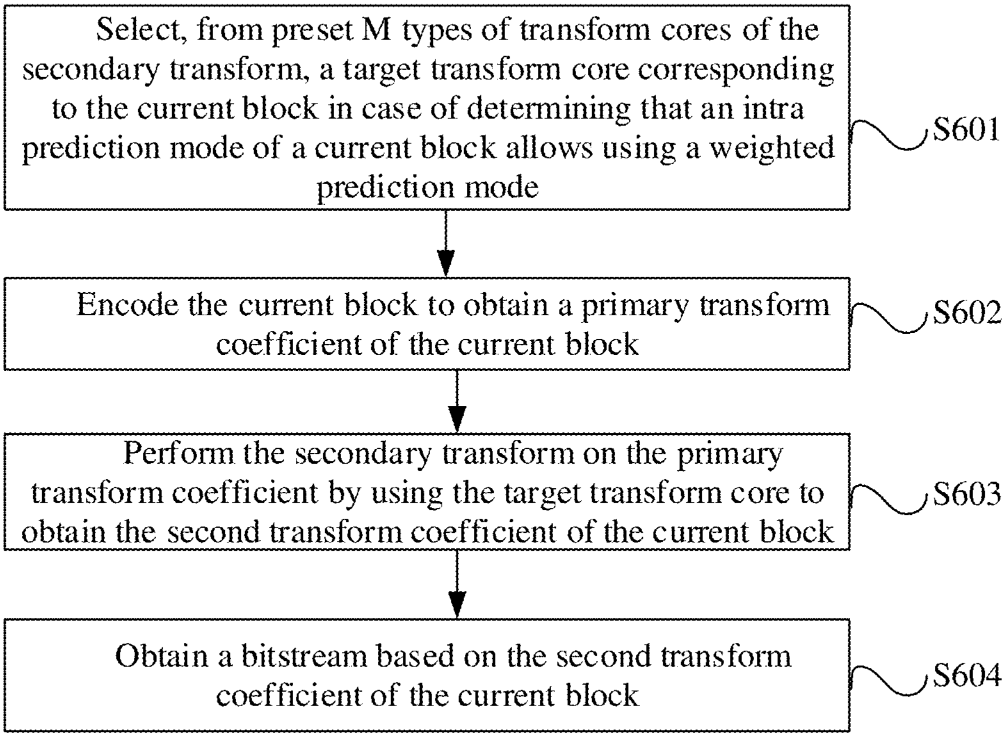
FIG. 13 is a flowchart of the method for encoding video according to an embodiment of the present disclosure.
Figure 14:
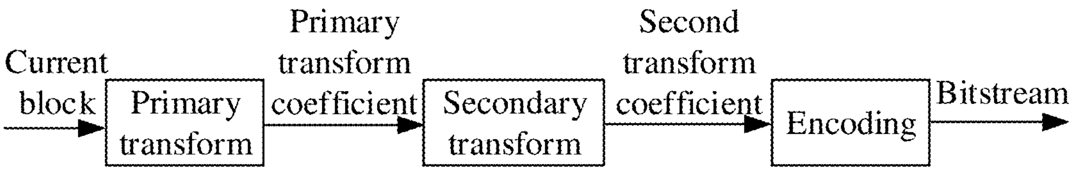
FIG. 14 is a schematic diagram of processes for encoding video according to an embodiment of the present disclosure.

FIG. 13 is a flowchart of the method for encoding video according to the embodiment of the present disclosure. FIG. 14 is a schematic diagram of processes for encoding video according to the embodiment of the present disclosure. The embodiments of the present disclosure are applied to the video encoders illustrated in FIG. 1 and FIG. 2. As illustrated in FIG. 13 and FIG. 14, the method of the embodiment of the present disclosure includes the following operations.

In operation S601, in case of determining that an intra prediction mode of a current block allows using a weighted prediction mode, a target transform core corresponding to the current block is selected from preset M types of transform cores of the secondary transform. M is a positive integer greater than 1.

In the process for encoding video, a video encoder receives a video stream. The video stream is composed of a series of picture frames. Each frame of picture of the video stream is encoded, and the video encoder performs block partition on the frame of picture to obtain the current block.

In some embodiments, the current block may be also referred to as a current coding block, a current picture block, a coding block, a current coding unit, a current to-be-encoded block, a current to-be-encoded picture block, etc.

When performing the block partition, the blocks partitioned by the traditional method contain both the chroma component of the current block position and the luma component of the current block position. The individual component block can be partitioned by the dual tree technology, such as the individual luma block and the individual chroma block. The luma block may be understood as a block that contains only the luma component at the current block position, and the chroma block may be understood as a block that contains only the chroma component at the current block position. In this way, luma component and chroma component at the same position may belong to different blocks, and the partition has greater flexibility. If the dual tree is used in the partition of the CU, some CUs contain both luma component and chroma component, some CUs only contain the luma component, and some CUs only contain the chroma component.

In some embodiments, the current block of the embodiments of the present disclosure includes only the chroma component, which may be understood as a chroma block.

In some embodiments, the current block of the embodiments of the present disclosure includes only the luma component, which may be understood as a luma block.

In some embodiments, the current block includes both the luma component and the chroma component.

In the embodiment of the present disclosure, the prediction mode of the current block includes a single prediction mode (i.e. a non-weighted prediction mode) and may also include the weighted prediction mode.

In some embodiments, it may be determined whether the intra prediction mode of the current block allows using the weighted prediction mode by the following manners.

In a first manner, the bitstream includes a flag a indicating whether the current block allows using the weighted prediction mode. The decoding end obtains the flag a by decoding the bitstream, and judges whether the current block allows using the weighted prediction mode based on the value of the flag a. For example, when the value of the flag a is the first value (for example, 1), it is determined that the current block allows using the weighted prediction mode, and when the value of the flag a is the second value (for example, 0), it is determined that the current block does not allow using the weighted prediction mode. Optionally, the flag a may be a sequence-level flag, a frame-level flag, a macroblock-level flag or a coding block-level flag.

In a second manner, the bitstream does not carry the flag a, but whether the current block allows using the weighted prediction mode is determined through the default manner. For example, if it is defaulted that the current sequence, the current frame, the current macroblock or the current block does not allow using the weighted prediction mode, it is determined that the current block does not allow using the weighted prediction mode. If it is defaulted that the current sequence, the current frame, the current macroblock or the current block allows using the weighted prediction mode, it is determined that the current block allows using the weighted prediction mode.

In some embodiments, a default transform core in the M types of the transform cores of the secondary transform is determined as the target transform core corresponding to the current block.

In some embodiments, the above operation S601 includes the following operations.

In operation S601-A1, the intra prediction mode of the current block is determined.

In operation S601-A2, a target transform core corresponding to the current block is selected from the preset M types of the transform cores of the secondary transform based on the intra prediction mode of the current block.

The implementation manners of above operation S601-A1 include but are not limited to the following manners.

In a first manner, for each of the preset K intra prediction modes and the preset weighted prediction modes, the encoding cost (such as rate distortion cost) corresponding to each intra prediction mode is determined. The prediction mode with the minimum encoding cost in the K intra prediction modes and the preset weighted prediction modes is determined as the intra prediction mode of the current block.

In a second manner, firstly, Q intra prediction modes with the minimum costs are coarsely screened from preset K intra prediction modes. K and Q are positive integers. Then, an intra prediction mode with a minimum cost is finely screened, from the Q intra prediction modes and the preset weighted prediction mode, as the intra prediction mode of the current block.

Specifically, for each of the K intra prediction modes, the prediction value of the current block is determined when the intra prediction mode is used to encode the current block; the distortion D1 between the prediction value corresponding to the intra prediction mode and the original value of the current block is calculated, and the number R2 of bits consumed when encoding the flag bit (flag) of the intra prediction mode is calculated. Based on the distortion D1 and the number R2 of bits, the first rate distortion cost J1 corresponding to the intra prediction mode is determined, for example, J1=D1+R1. According to the above manner, the first rate distortion cost J1 corresponding to each of the K intra prediction modes may be determined. Finally, Q intra prediction modes with the minimum costs are coarsely screened from K intra prediction modes.

Then, from the Q intra prediction modes and the preset weighted prediction mode, an intra prediction mode with a minimum cost is finely screened as the intra prediction mode of the current block. Specifically, for each intra prediction mode of Q intra prediction modes and preset weighted prediction mode, the reconstructed value of the current block is determined when the current block is encoded by using the intra prediction mode; the distortion D2 between the reconstructed value and the original value of the current block is calculated, and the number R2 of bits consumed when the current block is encoded by using the intra prediction mode is counted. Based on the distortion D2 and the number R2 of bits, the second rate distortion cost J2 corresponding to the intra prediction mode is determined, for example, J2=D2+R2. According to the above method, the second rate distortion cost J2 corresponding to each of the Q intra prediction modes and the preset weighted prediction mode may be determined. Finally, from the Q intra prediction modes and the preset weighted prediction mode, the intra prediction mode with the minimum second rate distortion cost J2 is determined as the intra prediction mode of the current block.

It should be noted that in case of determining that the intra prediction mode of the current block is the weighted prediction mode, the intra prediction mode of the current block includes N intra prediction modes, and N is a positive integer greater than 1. In case of determining that the intra prediction mode of the current block is the non-weighted prediction mode, the intra prediction mode of the current block is one intra prediction mode.

After the intra prediction mode of the current block is determined based on above operations, the operation S601-A2 is performed. That is, based on the intra prediction mode of the current block, the target transform core corresponding to the current block is selected from the preset M types of transform cores of the secondary transform.

The implementation manners of the above operation S601-A2 include but are not limited to the following manners.

In a first manner, if the intra prediction mode of the current block is the weighted prediction mode and the weighted prediction mode includes N intra prediction modes, the transform cores of the secondary transform corresponding to the N intra prediction modes are determined from the preset M types of the transform cores of the secondary transform. The rate distortion costs are determined when decoding by using the transform cores of the secondary transform corresponding to the N intra prediction modes. A transform core of the secondary transform with a minimum rate distortion cost is determined as the target transform core corresponding to the current block.

In a second manner, if the intra prediction mode of the current block is the weighted prediction mode and the weighted prediction mode includes N intra prediction modes, the rate distortion costs corresponding to the N intra prediction modes are determined. In the M types of the transform cores of the secondary transform, the first transform core (corresponding to the intra prediction mode) with a minimum rate distortion cost is inquired. The first transform core is determined as the target transform core corresponding to the current block.

In a third manner, if the intra prediction mode of the current block is a non-weighted prediction mode, the transform core corresponding to the intra prediction mode of the current block in the M types of the transform cores of the secondary transform is determined as the target transform core corresponding to the current block.

In a fourth manner, if the intra prediction mode of the current block is a non-weighted prediction mode, the transform core corresponding to a second intra prediction mode in the M types of the transform cores of the secondary transform is determined as the target transform core corresponding to the current block.

The second intra prediction mode is different from the intra prediction mode of the current block.

For example, if the intra prediction mode of the current block is a Planar mode, the second intra prediction mode is a DC mode.

For another example, if the intra prediction mode of the current block is a non-Planar mode, the second intra prediction mode is a Planar mode.

In operation S602, the current block is encoded to obtain a primary transform coefficient of the current block.

Specifically, the current block is predicted by using the intra prediction mode of the current block determined in the above operations to obtain a prediction block of the current block, and then, a residual block of the current block is obtained based on the prediction block of the current block and the current block. For example, the pixel value of the prediction block is subtracted from the pixel value of the current block to obtain a residual block of the current block.

Then, the primary transform is performed on the residual block to obtain the primary transform coefficient of the current block.

In an example, the encoding end performs the primary transform on the residual block of the current block by using the DCT-II transform manner illustrated in the above formula (1) to obtain the primary transform coefficient of the current block.

In another example, the encoding end performs the primary transform on the residual block of the current block by using the DCT-VIII transform manner illustrated in the above formula (2) to obtain the primary transform coefficient of the current block.

In another example, the encoding end performs the primary transform on the residual block of the current block by using the DST-VII transform manner illustrated in the above formula (3) to obtain the primary transform coefficient of the current block.

In operation S603, the secondary transform is performed on the primary transform coefficient by using the target transform core to obtain the second transform coefficient of the current block.

In the embodiments of the present disclosure, the manners for performing inverse secondary transform on the second transform coefficient based on the transform core of the secondary transform to obtain the primary transform coefficient of the current block are not limited.

For example, according to the above formula (8), the secondary transform is performed on the primary transform coefficient by using the target transform core to obtain the second transform coefficient of the current block. That is, the product of the target transform core and the primary transform coefficient is used as the second transform coefficient of the current block.

In operation S604, a bitstream is obtained based on the second transform coefficient of the current block.

In an example, the quantization is not performed on the second transform coefficient of the current block, and the second transform coefficient is directly encoded to obtain the bitstream.

In an example, the quantization is performed on the second transform coefficient of the current block to obtain the quantization coefficient, and the quantization coefficient is encoded to obtain the bitstream.

In some embodiments, if the transform cores of the secondary transform corresponding to the current block are a type of transform cores, the encoding end may indicate to the decoding end which transform core in the type of transform cores is specifically used by the encoding end. Optionally, the indication information may be carried in the bitstream.

In some embodiments, the encoding end may also signal the first flag in the bitstream. The first flag is used for indicating that the target transform core is a transform core corresponding to the target prediction mode.

In some embodiments, before signalling the first flag in the bitstream, the encoding end firstly determines the weights when the prediction values corresponding to the N intra prediction modes are weighted. If the ratio between the minimum weight and the maximum weight which correspond to the N intra prediction modes is greater than the preset value, the first flag is signalled in the bitstream.

For example, for the TIMD, it is assumed that mode1 and mode2 are two modes with minimum cost, and their cost values are cost1 and cost2 respectively. From the above formulas (6) and (7), it may be seen that the weight of mode1 is positively correlated with cost2, and the weight of mode2 is positively correlated with cost1. When cost1/cost2>$\alpha$, $\alpha$ is a preset value and is a positive number (such as 0.8) close to 1, the selection of the transform core at the decoding end is the target transform core indicated by the first flag, and then performs the operation S402-A1 of decoding the bitstream to obtain the first flag. This is because when cost1 is much less than cost2, the weights of the mode 1 and the mode 2 are quite different, which leads to the prediction result being almost the same as that of mode1. In this way, there is no need to further consider the transform core corresponding to mode2.

In some embodiments, if the intra prediction mode of the current block is the weighted prediction mode and the weighted prediction mode includes N intra prediction modes, the target prediction mode is one of the P intra prediction modes. The P intra prediction modes are the intra prediction modes related to a selection of a transform core of the secondary transform of the current block in the N intra prediction modes, and P is a positive integer greater than 1 and less than or equal to N.

In some embodiments, if the selection of the transform core of the secondary transform of the current block is related to an angular prediction mode, the P intra prediction modes are angular prediction modes in the N intra prediction modes.

Optionally, if the selection of the transform core of the secondary transform of the current block is related to the N intra prediction modes of the current block, the P intra prediction modes are the N intra prediction modes.

In some embodiments, if types of the transform cores of the secondary transform corresponding to the P intra prediction modes are identical, the first flag is further used to indicate whether to transpose a transform coefficient after an inverse secondary transform.

In some embodiments, if the intra prediction mode of the current block is a non-weighted prediction mode, the method further includes determining the value of the first flag based on the target prediction mode.

For example, if the target transform core corresponding to the current block is the transform core corresponding to the intra prediction mode of the current block, the value of the first flag is the first value.

For another example, if the target transform core corresponding to the current block is the transform core corresponding to the second intra prediction mode, the value of the first flag is the second value.

Optionally, if the intra prediction mode of the current block is a Planar mode, the second intra prediction mode is a DC mode.

Optionally, if the intra prediction mode of the current block is a non-Planar mode, the second intra prediction mode is a Planar mode.

In the method for encoding of the embodiment of the present disclosure, if the encoding end determines that the intra prediction mode of the current block allows using the weighted prediction mode, the target transform core corresponding to the current block is selected from the preset M types of transform cores of the secondary transform. M is a positive integer greater than 1. The current block is encoded to obtain the primary transform coefficient of the current block. The secondary transform is performed on the primary transform coefficient by using the target transform core to obtain the second transform coefficient of the current block. A bitstream is obtained based on the second transform coefficient of the current block. That is, in the present disclosure, the encoding end selects the target transform core corresponding to the current block from the preset M types transform cores of the secondary transform, instead of fixedly selecting a transform core corresponding to a certain mode, so that the selection flexibility of the transform core is improved, the transform effect is improved, and the overall performance of encoding is improved.

Figure 15:
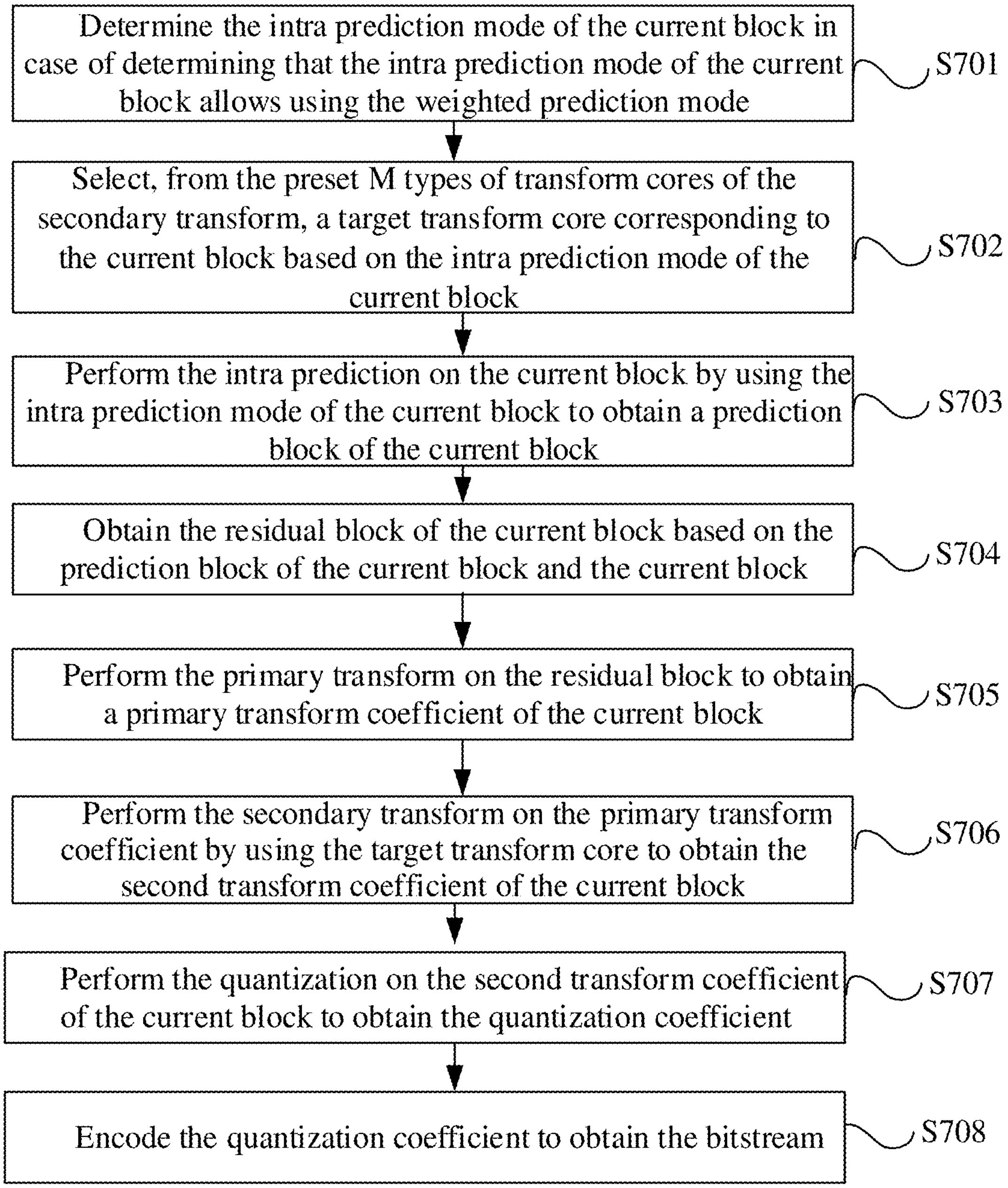
FIG. 15 is a flowchart of the method for encoding video according to an embodiment of the present disclosure.
Figure 16:
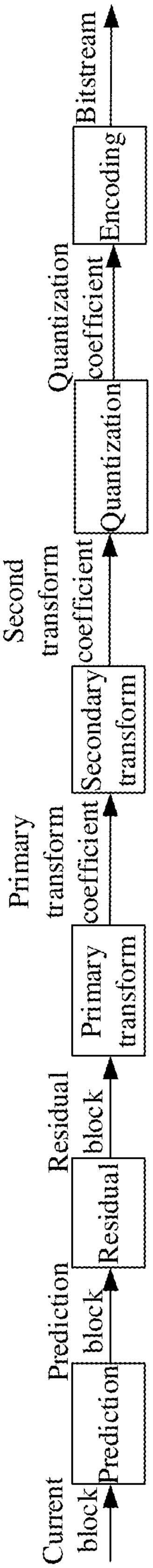
FIG. 16 is a schematic diagram of processes for encoding video according to an embodiment of the present disclosure.

FIG. 15 is a flowchart of the method for encoding video according to an embodiment of the present disclosure. FIG. 16 is a schematic diagram of processes for encoding video according to an embodiment of the present disclosure. The embodiments of the present disclosure are applied to the video encoders illustrated in FIG. 1 and FIG. 2. As illustrated in FIG. 15 and FIG. 16, the method of the embodiment of the present disclosure includes the following operations.

In operation S701, in case of determining that the intra prediction mode of the current block allows using the weighted prediction mode, the intra prediction mode of the current block is determined.

The implementation manner of the above operation S701 is the same as the implementation manner of the above operation S601-A1. Thus, the implementation manner of the above operation S701 can refer to the description of the above operation S601-A1, which will not be repeated here.

In operation S702, a target transform core corresponding to the current block is selected from the preset M types of transform cores of the secondary transform based on the intra prediction mode of the current block.

The implementation manner of the above operation S702 is the same as the implementation manner of the above operation S601-A3. Thus, the implementation manner of the above operation S702 can refer to the description of the above operation S601-A3, which will not be repeated here.

In operation S703, the intra prediction is performed on the current block by using the intra prediction mode of the current block to obtain a prediction block of the current block.

It should be noted that the above operations S703 and S702 have no sequence when implementing, that is, the above operation S703 may be performed before the above operation S702, or after the above operation S702, or with the above operation S702 synchronously, which is not limited in the present disclosure.

In operation S704, the residual block of the current block is obtained based on the prediction block of the current block and the current block.

For example, the pixel value of the prediction block is subtracted from the pixel value of the current block to obtain a residual block of the current block.

In operation S705, the primary transform is performed on the residual block to obtain a primary transform coefficient of the current block.

The implementation process of the above operation S705 is the same as the implementation process of the above operation S602. Thus, the implementation process of the above operation S705 can refer to the description of the above operation S602, which will not be repeated here.

In operation S706, the secondary transform is performed on the primary transform coefficient by using the target transform core to obtain the second transform coefficient of the current block.

The implementation process of the above operation S706 is the same as the implementation process of the above operation S603. Thus, the implementation process of the above operation S706 can refer to the description of the above operation S603, which will not be repeated here.

In operation S707, the quantization is performed on the second transform coefficient of the current block to obtain the quantization coefficient.

In operation S708, the quantization coefficient is encoded to obtain the bitstream.

The implementation processes of the above operations S707 and S708 are the same as implementation processes of the above operation S604. Thus, the implementation processes of the above operations S707 and S708 can refer to the above description of the above operation S604, which will not be repeated here.

In the method for encoding video according to the embodiment of the present disclosure, if the encoding end determines that the intra prediction mode of the current block allows using the weighted prediction mode, the intra prediction mode of the current block is determined. Based on the intra prediction mode of the current block, the target transform core corresponding to the current block is selected from the preset M types of the transform cores of the secondary transform. The intra prediction is performed on the current block by using the intra prediction mode of the current block to obtain the prediction block of the current block. Based on the prediction block of the current block and the current block, the residual block of the current block is obtained. The primary transform is performed on the residual block to obtain the primary transform coefficient of the current block. The secondary transform is performed on the primary transform coefficient by using the target transform core to obtain the second transform coefficient of the current block. The quantization is performed on the second transform coefficient of the current block to obtain the quantization coefficient. The quantization coefficient is encoded to obtain the bitstream. That is, in the present disclosure, the encoding end selects the target transform core corresponding to the current block from the preset M types of transform cores of the secondary transform, instead of fixedly selecting a transform core corresponding to a certain mode, so that the selection flexibility of the transform core is improved, the transform effect is improved, and the overall performance of encoding is improved.

It should be understood that FIG. 9 to FIG. 16 are only examples of the present disclosure and should not be construed as limiting the present disclosure.

Preferred embodiments of the present disclosure have been described in detail with reference to the accompanying drawings, but the present disclosure is not limited to the specific details of the above embodiments. Within the scope of the technical conception of the present disclosure, various simple modifications may be made to the technical solutions of the present disclosure, and these simple modifications all belong to the scope of protection of the present disclosure. For example, each of the specific technical features described in the above specific implementations may be combined in any suitable manner without contradiction, and various possible combinations are not further described in the present disclosure in order to avoid unnecessary repetition. For another example, any combination may be made between the various embodiments of the present disclosure so long as it does not depart from the idea of the present disclosure and is likewise to be regarded as the contents of the present disclosure.

It should also be understood that in the various method embodiments of the present disclosure, the size of the sequence number of the above-mentioned processes does not mean the order of execution, and the execution order of the processes should be determined by their functions and inherent logic, and should not constitute any limitation on the implementation process of the embodiments of the present disclosure. In addition, in embodiments of the present disclosure, the term "and/or" is merely used for describing an association relationship of related objects, which indicates that three relationships may exist. Specifically, A and/or B may represent three situations: A exits alone, A and B exist at the same time, and B exists alone. In addition, the character "/" in the present disclosure generally indicates that there is "or" relationship between the related objects.

Embodiments of the methods of the present disclosure are described in detail above with reference to FIG. 9 to FIG. 16, and embodiments of the apparatus of the present disclosure are described in detail below with reference to FIG. 17 to FIG. 19.

Figure 17:
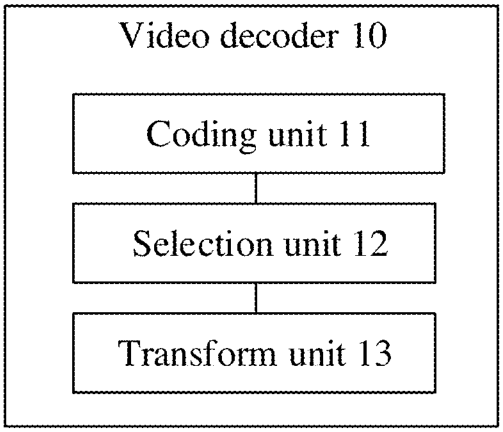
FIG. 17 is a schematic block diagram of a video decoder according to an embodiment of the present disclosure.

FIG. 17 is a schematic block diagram of a video decoder according to an embodiment of the present disclosure.

As illustrated in FIG. 17, the video decoder 10 includes a coding unit 11, a selection unit 12 and a transform unit 13.

The coding unit 11 is configured to decode a bitstream to obtain a second transform coefficient of a current block. The second transform coefficient is a transform coefficient formed through performing a secondary transform on a residual block of the current block by an encoding end.

The selection unit 12 is configured to select, from preset M types of transform cores of the secondary transform, a target transform core corresponding to the current block in case of determining that an intra prediction mode of the current block allows using a weighted prediction mode. M is a positive integer greater than 1

The transform unit 13 is configured to perform an inverse secondary transform on the second transform coefficient by using the target transform core to obtain a primary transform coefficient of the current block, and perform an inverse primary transform on the primary transform coefficient to obtain the residual block of the current block.

In some embodiments, the selection unit 12 is specifically configured to: decode the bitstream to obtain a first flag for indicating that the target transform core is a transform core corresponding to a target prediction mode; and determine, based on the first flag, the transform core corresponding to the target prediction mode in the M types of the transform cores of the secondary transform as the target transform core.

In some embodiments, the selection unit 12 is specifically configured to: determine the intra prediction mode of the current block; determine the target prediction mode based on the intra prediction mode of the current block and the first flag; and determine the transform core corresponding to the target prediction mode in the M types of the transform cores of the secondary transform as the target transform core.

In some embodiments, the selection unit 12 is specifically configured to: determine a prediction mode indicated by the first flag in N intra prediction modes as the target prediction mode in case that the intra prediction mode of the current block is the weighted prediction mode and the weighted prediction mode includes the N intra prediction modes. N is a positive integer greater than 1.

In some embodiments, the target prediction mode is one of P intra prediction modes, the P intra prediction modes are intra prediction modes related to a selection of a transform core of the secondary transform of the current block in the N intra prediction modes, and P is a positive integer greater than 1 and less than or equal to N.

In some embodiments, in case that the selection of the transform core of the secondary transform of the current block is related to an angular prediction mode, the P intra prediction modes are angular prediction modes in the N intra prediction modes.

Optionally, in case that the selection of the transform core of the secondary transform of the current block is related to the N intra prediction modes of the current block, the P intra prediction modes are the N intra prediction modes.

In some embodiments, in case that the intra prediction mode of the current block is the weighted prediction mode, the coding unit 11 is further configured to determine types of transform cores of the secondary transform corresponding to the P intra prediction modes. In case that the types of the transform cores of the secondary transform corresponding to the P intra prediction modes are identical, the first flag is further used for indicating whether to transpose a transform coefficient after the inverse secondary transform.

The transform unit 13 is specifically configured to perform, based on the types of the transform cores of the secondary transforms corresponding to the P intra prediction modes and the first flag, the inverse secondary transform on the second transform coefficient by using the target transform core to obtain the primary transform coefficient of the current block.

In some embodiments, in case of determining that the types of the transform cores corresponding to the P intra prediction modes are different, the transform unit 13 is specifically configured to: perform the inverse secondary transform on the second transform coefficient by using the target transform core indicated by the first flag; and determine the transform coefficient after the inverse secondary transform as the primary transform coefficient of the current block;

in case of determining that the types of the transform cores corresponding to the P intra prediction modes are identical, and the first flag indicating to transpose the transform coefficient after the inverse secondary transform, the transform unit 13 is further configured to: perform the inverse secondary transform on the second transform coefficient by using the target transform core; transpose the transform coefficient after the inverse secondary transform; and determine a transposed transform coefficient as the primary transform coefficient of the current block; and in case of determining that the types of the transform cores corresponding to the P intra prediction modes are identical, and the first flag indicating that no transpose is performed on the transform coefficient after the inverse secondary transform, the transform unit 13 is further configured to: perform the inverse secondary transform on the second transform coefficient by using the target transform core; and determine the transform coefficient after the inverse secondary transform as the primary transform coefficient of the current block.

In some embodiments, the selection unit 12 is specifically configured to determine the target prediction mode based on a value of the first flag in case that the intra prediction mode of the current block is a non-weighted prediction mode.

In some embodiments, the selection unit 12 is specifically configured to: determine that the target prediction mode is the intra prediction mode of the current block in case that the value of the first flag is a first value;

the selection unit 12 is further configured to: determine that the target prediction mode is a second intra prediction mode (different from the intra prediction mode of the current block) in case that the value of the first flag is a second value.

Optionally, in case that the intra prediction mode of the current block is a Planar mode, the second intra prediction mode is a DC mode.

In case that the intra prediction mode of the current block is a non-Planar mode, the second intra prediction mode is a Planar mode.

In some embodiments, the coding unit 11 is further configured to determine weights when prediction values corresponding to the N intra prediction modes are weighted, and decode the bitstream to obtain the first flag in case that a ratio between a minimum weight and a maximum weight which correspond to the N intra prediction modes is greater than a preset value.

In some embodiments, in case that the intra prediction mode of the current block is the weighted prediction mode and the weighted prediction mode includes N intra prediction modes, the selection unit 12 is specifically configured to: determine transform cores of the secondary transform corresponding to the N intra prediction modes from the preset M types of the transform cores of the secondary transform; determine rate distortion costs when decoding by using the transform cores of the secondary transform corresponding to the N intra prediction modes; and determine a transform core of the secondary transform with a minimum rate distortion cost as the target transform core corresponding to the current block.

In some embodiments, in case that the intra prediction mode of the current block is the weighted prediction mode and the weighted prediction mode includes N intra prediction modes, the selection unit 12 is specifically configured to: determine rate distortion costs corresponding to the N intra prediction modes; inquire a first transform core (corresponding to an intra prediction mode) with a minimum rate distortion cost in the M types of the transform cores of the secondary transform; and determine the first transform core as the target transform core corresponding to the current block.

It should be understood that apparatus embodiments and method embodiments may correspond to each other and similar descriptions may refer to method embodiments. To avoid repetition, the similar description will not be repeated here. Specifically, the video decoder 10 illustrated in FIG. 17 may perform the method for decoding of the embodiments of the present disclosure, and the aforementioned and other operations and/or functions of the respective units in the video decoder 10 are respectively used to implement corresponding flows in the respective methods in the above-mentioned methods for decoding, which will not be repeated here for the sake of brevity.

Figure 18:
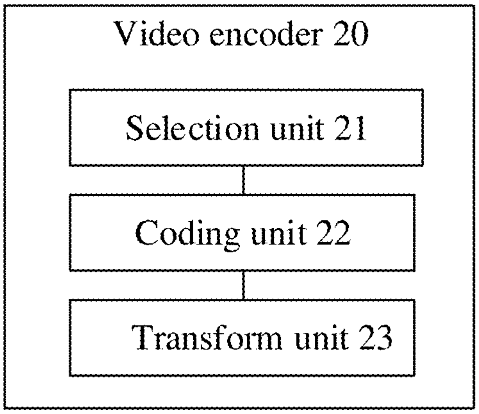
FIG. 18 is a schematic block diagram of a video encoder according to an embodiment of the present disclosure.

FIG. 18 is a schematic block diagram of a video encoder according to an embodiment of the present disclosure.

As illustrated in FIG. 18, the video encoder 20 may include a selection unit 21, a coding unit 22 and a transform unit 23.

The selection unit 21 is configured to select, from preset M types of transform cores of a secondary transform, a target transform core corresponding to a current block in case of determining that an intra prediction mode of the current block allows using a weighted prediction mode. M is a positive integer greater than 1.

The coding unit 22 is configured to encode the current block to obtain a primary transform coefficient of the current block.

The transform unit 23 is configured to perform the secondary transform on the primary transform coefficient by using the target transform core to obtain a second transform coefficient of the current block.

The coding unit 22 is further configured to obtain a bitstream based on the second transform coefficient of the current block.

In some embodiments, the selection unit 21 is specifically configured to: determine the intra prediction mode of the current block; and select, from the preset M types of the transform cores of the secondary transform, the target transform core corresponding to the current block based on the intra prediction mode of the current block.

In some embodiments, the selection unit 21 is specifically configured to: coarsely screen Q intra prediction modes with minimum costs from preset K intra prediction modes; and finely screen, from the Q intra prediction modes and a preset weighted prediction mode, an intra prediction mode with a minimum cost as the intra prediction mode of the current block. K and Q are positive integers, and the K intra prediction modes include the weighted prediction mode.

In some embodiments, the selection unit 21 is specifically configured to: determine transform cores of the secondary transform corresponding to the N intra prediction modes from the preset M types of the transform cores of the secondary transform in case that the intra prediction mode of the current block is the weighted prediction mode and the weighted prediction mode includes N intra prediction modes; determine rate distortion costs when decoding by using the transform cores of the secondary transform corresponding to the N intra prediction modes; and determine a transform core of the secondary transform with a minimum rate distortion cost as the target transform core corresponding to the current block.

In some embodiments, the selection unit 21 is specifically configured to: determine rate distortion costs corresponding to the N intra prediction modes in case that the intra prediction mode of the current block is the weighted prediction mode and the weighted prediction mode includes N intra prediction modes; inquire a first transform core (corresponding to an intra prediction mode) with a minimum rate distortion cost in the M types of the transform cores of the secondary transform; and determine the first transform core as the target transform core corresponding to the current block.

In some embodiments, the coding unit 22 is further configured to signal a first flag in the bitstream. The first flag is used for indicating that the target transform core is a transform core corresponding to a target prediction mode.

In some embodiments, in case that the intra prediction mode of the current block is the weighted prediction mode and the weighted prediction mode includes N intra prediction modes, the target prediction mode is one of P intra prediction modes, the P intra prediction modes are intra prediction modes related to a selection of a transform core of the secondary transform of the current block in the N intra prediction modes, and P is a positive integer greater than 1 and less than or equal to N.

In some embodiments, in case that the selection of the transform core of the secondary transform of the current block is related to an angular prediction mode, the P intra prediction modes are angular prediction modes in the N intra prediction modes;

optionally, in case that the selection of the transform core of the secondary transform of the current block is related to the N intra prediction modes of the current block, the P intra prediction modes are the N intra prediction modes.

In some embodiments, in case that types of the transform cores of the secondary transform corresponding to the P intra prediction modes are identical, the first flag is further used for indicating whether to transpose a transform coefficient after an inverse secondary transform.

In some embodiments, in case that the intra prediction mode of the current block is a non-weighted prediction mode, the selection unit 21 is specifically configured to: determine a transform core corresponding to the intra prediction mode of the current block in the M types of the transform cores of the secondary transform as the target transform core corresponding to the current block; or determine a transform core corresponding to a second intra prediction mode in the M types of the transform cores of the secondary transform as the target transform core corresponding to the current block, the second intra prediction mode is different from the intra prediction mode of the current block.

In some embodiments, in case that the target transform core corresponding to the current block is the transform core corresponding to the intra prediction mode of the current block, a value of the first flag is a first value.

In case that the target transform core corresponding to the current block is the transform core corresponding to the second intra prediction mode, the value of the first flag is a second value.

Optionally, in case that the intra prediction mode of the current block is a Planar mode, the second intra prediction mode is a DC mode.

In case that the intra prediction mode of the current block is a non-Planar mode, the second intra prediction mode is a Planar mode.

In some embodiments, the coding unit 22 is further configured to: determine weights when prediction values corresponding to N intra prediction modes are weighted; and signal the first flag in the bitstream in case that a ratio between a minimum weight and a maximum weight which correspond to the N intra prediction modes is greater than a preset value.

It should be understood that apparatus embodiments and method embodiments may correspond to each other and similar descriptions may refer to method embodiments. To avoid repetition, the similar description will not be repeated here. Specifically the video encoder 20 illustrated in FIG. 18 may perform the method for encoding of the embodiments of the present disclosure, and the aforementioned and other operations and/or functions of the respective units in the video encoder 20 are respectively used to implement corresponding flows in the respective methods in the above-mentioned method for encoding, which will not be repeated here for the sake of brevity.

Apparatus and systems of embodiments of the present disclosure are described above from the perspective of functional units in combination with the accompanying drawings. It should be understood that the functional units may be implemented in hardware form, by instructions in software form, or by a combination of hardware and software units. In particular, various operation of the method embodiments in the embodiments of the present disclosure may be completed by the integrated logic circuit of the hardware in the processor and/or the instruction in the form of software, and the operations of the methods disclosed in combination with the embodiments of the present disclosure may be directly embodied as the execution of the hardware decoding processor or the combined execution of the hardware and software units in the decoding processor. Optionally, the software units may be located in a storage medium mature in the art such as a Random Access Memory (RAM), a flash memory, a Read-Only Memory (ROM), a Programmable ROM (PROM), an Electrically Erasable PROM (EE PROM), a register, etc. The storage medium is located in the memory, and the processor reads the information in the memory and completes the operations in the method embodiments in combination with its hardware.

Figure 19:
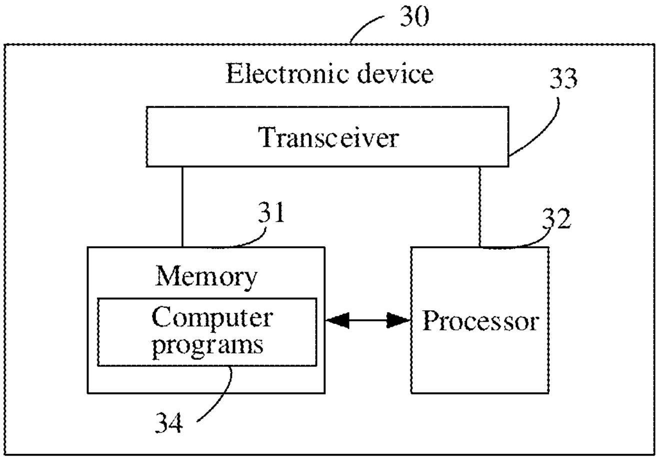
FIG. 19 is a schematic block diagram of an electronic device according to an embodiment of the present disclosure.

FIG. 19 is a schematic block diagram of an electronic device according to an embodiment of the present disclosure.

As illustrated in FIG. 19, the electronic device 30 may be a video encoder or a video decoder as described in the embodiments of the present disclosure. The electronic device 30 may include a memory 31 and a processor 32.

The memory 31 is configured to store computer programs 34 and transmit the computer programs 34 to the processor 32. In other words, the processor 32 may invoke and run the computer programs 34 from the memory 31 to implement the methods in embodiments of the present disclosure.

For example, the processor 32 may be configured to perform the operations in the method 200 described above according to instructions in the computer programs 34.

In some embodiments of the present disclosure, the processor 32 may include, but is not limited to a general purpose processor, a Digital Signal Processor (DSP), an Application Specific Integrated Circuit (ASIC), a Field Programmable Gate Array (FPGA) or other programmable logic devices, discrete gate or transistor logic devices, discrete hardware components and so on.

In some embodiments of the present disclosure, the memory 31 includes, but is not limited to:

a Volatile memory and/or a nonvolatile memory. The nonvolatile memory may be a ROM, a PROM, an Erasable PROM (EPROM), an Electrically Erasable PROM (EE-PROM), or a flash memory. The volatile memory may be a RAM, which serves as an external cache. By way of illustration, but not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM), and Direct Rambus RAM (DR RAM).

In some embodiments of the present disclosure, the computer programs 34 may be divided into one or more units stored in the memory 31 and executed by the processor 32 to complete the methods provided by the present disclosure. The one or more units may be a series of computer program instruction segments capable of performing specific functions. The instruction segments are used for describing the execution of the computer programs 34 in the electronic device 30.

As illustrated in FIG. 19, the electronic device 30 may further include a transceiver 33.

The transceiver 33 may be connected to the processor 32 or the memory 31.

The processor 32 may control the transceiver 33 to communicate with other devices and in particular may transmit information or data to other devices or receive information or data from other devices. The transceiver 33 may include a transmitter and a receiver. The transceiver 33 may further include antennas, and the number of antennas may be one or more.

It should be understood that the various components in the electronic device 30 are connected by a bus system. The bus system includes a power bus, a control bus and a status signal bus in addition to a data bus.

Figure 20:
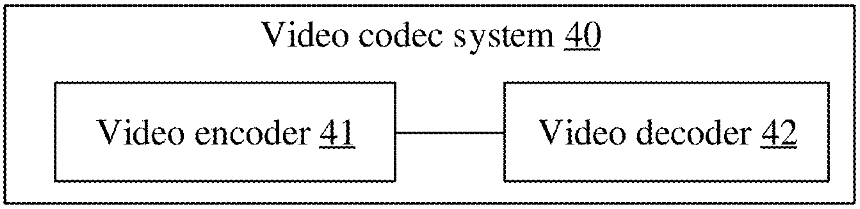
FIG. 20 is a schematic block diagram of a video codec system according to an embodiment of the present disclosure.

FIG. 20 is a schematic block diagram of a video codec system according to an embodiment of the present disclosure.

As illustrated in FIG. 20, the video codec system 40 may include a video encoder 41 and a video decoder 42. The video encoder 41 is used for performing a method for encoding video in the embodiments of the present disclosure, and the video decoder 42 is used for performing a method for decoding video in the embodiments of the present disclosure.

The present disclosure further provides a computer storage medium having stored thereon a computer program that, when executed by a computer, causes the computer to perform the methods in the method embodiments described above. In other words, the embodiments of the present disclosure also provide a computer program product including instructions that, when executed by a computer, cause the computer to perform the methods in the method embodiments described above.

The present disclosure further provides a bitstream, which is generated through the above method for encoding. Optionally, the bitstream includes a first flag.

When the methods are implemented in software, they can be implemented in whole or in part in the form of a computer program product. The computer program product includes one or more computer instructions. When the computer program instructions are loaded and executed on a computer, the flows or functions according to embodiments of the present disclosure are generated in whole or in part. The computer may be a general purpose computer, a special purpose computer, a computer network, or other programmable device. The computer instructions may be stored in a computer readable storage medium, or may be transmitted from a computer readable storage medium to another computer readable storage medium. For example, the computer instructions may be transmitted from a Web site, a computer, a server, or a data center via wired (for example, coaxial cable, optical fiber, digital subscriber line (DSL)) or wireless (for example, infrared, wireless, microwave, etc.) to another Web site, computer, server, or data center. The computer readable storage medium may be any available medium accessible to a computer or a data storage device (such as a server, data center, etc) containing one or more available medium integration. The available medium may be a magnetic medium (for example, a floppy disk, a hard disk, a magnetic tape), an optical medium (for example, a digital video disc (DVD)), or a semiconductor medium (for example, a solid state disk (SSD)), etc.

Those of ordinary skill in the art will appreciate that the various example units and algorithm operations described in combination with the embodiments disclosed herein may be implemented in electronic hardware or a combination of computer software and electronic hardware. Whether these functions are performed in hardware or software depends on the specific application and design constraints of the technology solutions. Skilled artisans may use different methods for each particular application to implement the described functionality, but such implementation should not be considered outside the scope of the present disclosure.

In several embodiments provided by the present disclosure, it should be understood that the disclosed systems, apparatuses and methods may be implemented in other ways. For example, the above-described apparatus embodiments are only schematic, for example, the division of the units is only a logical function division, and in practice, there may be another division mode, for example, multiple units or components may be combined or integrated into another system, or some features may be ignored or not performed. On the other hand, the coupling, direct coupling or communication connection between each other illustrated or discussed may be indirect coupling or communication connection through some interface, device or unit, and may be electrical, mechanical or other form.

The units illustrated as separate parts may or may not be physically separated, and the components displayed as units may or may not be physical units. That is, they may be located in one place, or may be distributed over a plurality of network elements. Part or all of the units may be selected according to the actual needs to achieve the purpose of the embodiments. For example, the functional units in various embodiments of the present disclosure may be integrated in one processing unit, various units may exist physically alone, or two or more units may be integrated in one unit.

The above contents are only the specific implementation of the present disclosure, but the scope of protection of the present disclosure is not limited thereto. Any technician familiar with this technical field can easily think of changes or substitutions within the technical scope disclosed in the present disclosure, which should be covered within the scope of protection of the present disclosure. Therefore, the scope of protection of the present disclosure shall be subject to the scope of protection of claims.

The invention claimed is:

1. A method for decoding video, comprising:

decoding a bitstream to obtain a second transform coefficient of a current block, wherein the second transform coefficient is a transform coefficient formed through performing a secondary transform at an encoding end;

in case of determining that an intra prediction mode of the current block allows using a weighted prediction mode, selecting, from preset M types of transform cores of the secondary transform, a target transform core corresponding to the current block, wherein M is a positive integer greater than 1, and the weighted prediction mode represents that at least two intra prediction modes are used to respectively predict the current block, and prediction values corresponding to the at least two intra prediction modes are weighted;

performing an inverse secondary transform on the second transform coefficient by using the target transform core to obtain a primary transform coefficient of the current block; and performing an inverse primary transform on the primary transform coefficient to obtain a residual block of the current block.

2. The method of claim 1, wherein selecting, from the preset M types of the transform cores of the secondary transform, the target transform core corresponding to the current block comprises:

decoding the bitstream to obtain a first flag for indicating that the target transform core is a transform core corresponding to a target prediction mode; and determining, based on the first flag, the transform core corresponding to the target prediction mode in the M types of the transform cores of the secondary transform as the target transform core.

3. The method of claim 2, wherein determining, based on the first flag, the transform core corresponding to the target prediction mode in the M types of the transform cores of the secondary transform as the target transform core comprises:

determining the intra prediction mode of the current block;

determining the target prediction mode based on the intra prediction mode of the current block and the first flag; and determining the transform core corresponding to the target prediction mode in the M types of the transform cores of the secondary transform as the target transform core.

4. The method of claim 3, wherein determining the target prediction mode based on the intra prediction mode of the current block and the first flag comprises:

in case that the intra prediction mode of the current block is the weighted prediction mode and the weighted prediction mode comprises N intra prediction modes, determining a prediction mode indicated by the first flag in the N intra prediction modes as the target prediction mode, wherein N is a positive integer greater than 1.

5. The method of claim 4, wherein the target prediction mode is one of P intra prediction modes, the P intra prediction modes are intra prediction modes related to a selection of a transform core of the secondary transform of the current block in the N intra prediction modes, and P is a positive integer greater than 1 and less than or equal to N.

6. The method of claim 5, wherein in case that the selection of the transform core of the secondary transform of the current block is related to an angular prediction mode, the P intra prediction modes are angular prediction modes in the N intra prediction modes; or in case that the selection of the transform core of the secondary transform of the current block is related to the N intra prediction modes of the current block, the P intra prediction modes are the N intra prediction modes.

7. The method of claim 5, wherein in case that the intra prediction mode of the current block is the weighted prediction mode, the method further comprises:

determining types of transform cores of the secondary transform corresponding to the P intra prediction modes, wherein in case that the types of the transform cores of the secondary transform corresponding to the P intra prediction modes are identical, the first flag is further used for indicating whether to transpose a transform coefficient after the inverse secondary transform, wherein performing the inverse secondary transform on the second transform coefficient by using the target transform core to obtain the primary transform coefficient of the current block comprises:

performing, based on the types of the transform cores of the secondary transforms corresponding to the P intra prediction modes and the first flag, the inverse secondary transform on the second transform coefficient by using the target transform core to obtain the primary transform coefficient of the current block.

8. The method of claim 7, wherein performing, based on the types of the transform cores of the second transforms corresponding to the P intra prediction modes and the first flag, the inverse secondary transform on the second transform coefficient by using the target transform core to obtain the primary transform coefficient of the current block comprises:

in case of determining that the types of the transform cores corresponding to the P intra prediction modes are different, performing the inverse secondary transform on the second transform coefficient by using the target transform core indicated by the first flag, and determining the transform coefficient after the inverse secondary transform as the primary transform coefficient of the current block;

in case of determining that the types of the transform cores corresponding to the P intra prediction modes are identical, and the first flag indicating to transpose the transform coefficient after the inverse secondary transform, performing the inverse secondary transform on the second transform coefficient by using the target transform core, transposing the transform coefficient after the inverse secondary transform, and determining a transposed transform coefficient as the primary transform coefficient of the current block; and in case of determining that the types of the transform cores corresponding to the P intra prediction modes are identical, and the first flag indicating that no transpose is performed on the transform coefficient after the inverse secondary transform, performing the inverse secondary transform on the second transform coefficient by using the target transform core, and determining the transform coefficient after the inverse secondary transform as the primary transform coefficient of the current block.

9. The method of claim 3, wherein determining the target prediction mode based on the intra prediction mode of the current block and the first flag comprises:

in case that the intra prediction mode of the current block is a non-weighted prediction mode, determining the target prediction mode based on a value of the first flag.

10. The method of claim 9, wherein determining the target prediction mode based on the value of the first flag comprises:

in case that the value of the first flag is a first value, determining that the target prediction mode is the intra prediction mode of the current block; or in case that the value of the first flag is a second value, determining that the target prediction mode is another intra prediction mode different from the intra prediction mode of the current block.

11. The method of claim 10, wherein in case that the intra prediction mode of the current block is a Planar mode, the another intra prediction mode is a Direct Current (DC) mode; or in case that the intra prediction mode of the current block is a non-Planar mode, the another intra prediction mode is a Planar mode.

12. The method of claim 4, further comprising:

determining weights when prediction values corresponding to the N intra prediction modes are weighted, wherein decoding the bitstream to obtain the first flag comprises:

in case that a ratio between a minimum weight and a maximum weight which correspond to the N intra prediction modes is greater than a preset value, decoding the bitstream to obtain the first flag.

13. The method of claim 2, wherein in case that the intra prediction mode of the current block is the weighted prediction mode and the weighted prediction mode comprises N intra prediction modes, selecting, from the preset M types of the transform cores of the secondary transform, the target transform core corresponding to the current block comprises:

determining transform cores of the secondary transform corresponding to the N intra prediction modes from the preset M types of the transform cores of the secondary transform;

determining rate distortion costs when decoding by using the transform cores of the secondary transform corresponding to the N intra prediction modes; and determining a transform core of the secondary transform with a minimum rate distortion cost as the target transform core corresponding to the current block.

14. The method of claim 2, wherein in case that the intra prediction mode of the current block is the weighted prediction mode and the weighted prediction mode comprises N intra prediction modes, selecting, from the preset M types of the transform cores of the secondary transform, the target transform core corresponding to the current block comprises:

determining rate distortion costs corresponding to the N intra prediction modes;

inquiring, in the M types of the transform cores of the secondary transform, a first transform core, corresponding to an intra prediction mode, with a minimum rate distortion cost; and determining the first transform core as the target transform core corresponding to the current block.

15. A method for encoding video, comprising:

in case of determining that an intra prediction mode of a current block allows using a weighted prediction mode, selecting, from preset M types of transform cores of a secondary transform, a target transform core corresponding to the current block, wherein M is a positive integer greater than 1, and the weighted prediction mode represents that at least two intra prediction modes are used to respectively predict the current block, and prediction values corresponding to the at least two intra prediction modes are weighted;

encoding the current block to obtain a primary transform coefficient of the current block;

wherein the primary transform coefficient is a transform coefficient formed through performing a primary transform on a residual block of the current block;

performing the secondary transform on the primary transform coefficient by using the target transform core to obtain a second transform coefficient of the current block; and obtaining a bitstream based on the second transform coefficient of the current block.

16. The method of claim 15, further comprising:

signalling a first flag in the bitstream, wherein the first flag is used for indicating that the target transform core is a transform core corresponding to a target prediction mode.

17. The method of claim 16, wherein in case that the intra prediction mode of the current block is the weighted prediction mode and the weighted prediction mode comprises N intra prediction modes, the target prediction mode is one of P intra prediction modes, the P intra prediction modes are intra prediction modes related to a selection of a transform core of the secondary transform of the current block in the N intra prediction modes, and P is a positive integer greater than 1 and less than or equal to N.

18. The method of claim 17, wherein in case that types of the transform cores of the secondary transform corresponding to the P intra prediction modes are identical, the first flag is further used for indicating whether to transpose a transform coefficient after an inverse secondary transform.

19. A video decoder, comprising a processor and a memory;

wherein the memory is configured to store computer programs; and the processor is configured to:

decode a bitstream to obtain a second transform coefficient of a current block, wherein the second transform coefficient is a transform coefficient formed through performing a secondary transform at an encoding end;

select, from preset M types of transform cores of the secondary transform, a target transform core corresponding to the current block in case of determining that an intra prediction mode of the current block allows using a weighted prediction mode, wherein M is a positive integer greater than 1, and the weighted prediction mode represents that at least two intra prediction modes are used to respectively predict the current block, and prediction values corresponding to the at least two intra prediction modes are weighted; and perform an inverse secondary transform on the second transform coefficient by using the target transform core to obtain a primary transform coefficient of the current block, and perform an inverse primary transform on the primary transform coefficient to obtain a residual block of the current block.

20. A non-transitory computer-readable storage medium, having a computer program and a bitstream stored thereon, wherein the computer program, when executed by a computer, enables the computer to perform the steps of the method of claim 15 to generate the bitstream.

* * * * *